(12) United States Patent
Galpin et al.

(10) Patent No.: US 9,901,759 B2
(45) Date of Patent: *Feb. 27, 2018

(54) ANCHOR TROLLEY AND FALL ARREST SYSTEM AND METHOD IMPLEMENTING THE SAME

(71) Applicant: Transol Corporation, Morgantown, PA (US)

(72) Inventors: Arnold T. Galpin, Morgantown, PA (US); David A. Pisotti, Mohnton, PA (US)

(73) Assignee: Transol Corporation

( * ) Notice: Subject to any disclaimer, the term of this patent is extended or adjusted under 35 U.S.C. 154(b) by 0 days.

This patent is subject to a terminal disclaimer.

(21) Appl. No.: 14/639,284

(22) Filed: Mar. 5, 2015

(65) Prior Publication Data

US 2015/0238786 A1 Aug. 27, 2015

Related U.S. Application Data

(63) Continuation of application No. 13/686,713, filed on Nov. 27, 2012, now Pat. No. 8,978,821, which is a
(Continued)

(51) Int. Cl.
*A62B 35/00* (2006.01)
*B65G 9/00* (2006.01)
(Continued)

(52) U.S. Cl.
CPC ...... *A62B 35/0081* (2013.01); *A62B 35/0043* (2013.01); *A62B 35/0062* (2013.01);
(Continued)

(58) Field of Classification Search
CPC ........ A61H 3/008; B66C 9/18; B61B 10/025; E04G 2003/283; E04G 21/3261; A61G 7/1042; B61H 7/12; B61H 9/02; B61H 13/36; B61H 13/38; A62B 35/0062; A63B 69/0048; B65G 9/006
(Continued)

(56) References Cited

U.S. PATENT DOCUMENTS 775,488 A * 11/1904 Tetzlaff ..................... E06C 9/12
182/207
1,431,921 A 10/1922 Barnes
(Continued)

*Primary Examiner* — Daniel Cahn
(74) *Attorney, Agent, or Firm* — Belles Katz LLC

(57) ABSTRACT

A fall arrest anchor trolley for arresting the fall of a user. In one embodiment, the invention can be a system for arresting movement of a worker after falling from an elevated work surface comprising: a rail; a trolley in rollable contact with the rail, the trolley having a body, a brake sub-system, and a plurality of wheels, the brake sub-system comprising a brake rod, a brake pad connected to the brake rod, a lanyard connector connected to the brake rod, and a resilient element; the brake rod slidably coupled to the body so that the brake sub-system is alterable between: (1) a free state in which the brake pad is spaced a distance above the rail; and (2) an arrest state in which at least a portion of the brake pad frictionally engages the rail; the resilient element biasing the brake sub-system into the free state.

19 Claims, 25 Drawing Sheets

Related U.S. Application Data continuation-in-part of application No. 12/500,897, filed on Jul. 10, 2009, now Pat. No. 8,316,990.

(60) Provisional application No. 61/580,940, filed on Dec. 28, 2011.

(51) Int. Cl.
  *B61D 1/00* (2006.01)
  *B66C 9/18* (2006.01)
  *A61H 3/00* (2006.01)

(52) U.S. Cl.
  CPC ............... *B61D 1/00* (2013.01); *A61H 3/008* (2013.01); *B65G 9/006* (2013.01); *B66C 9/18* (2013.01)

(58) Field of Classification Search
  USPC ....... 188/42, 43, 210; 182/36, 12, 15, 17, 3; 482/69
  See application file for complete search history.

(56) References Cited

U.S. PATENT DOCUMENTS

| | | | |
|---|---|---|---|
| 1,471,657 A | 10/1923 | Hampton | |
| 1,846,537 A | 2/1932 | Withrow | |
| 2,120,997 A | 6/1938 | Weitzenberg | |
| 2,148,515 A | 2/1939 | Taylor | |
| 2,170,689 A | 8/1939 | Loomis | |
| 2,435,418 A | 2/1948 | Wright | |
| 2,589,803 A | 3/1952 | Haley | |
| 2,834,435 A * | 5/1958 | Vanderbeck | B66C 9/18 188/166 |
| 3,310,003 A * | 3/1967 | Bryan | B65G 9/002 104/94 |
| 3,397,650 A * | 8/1968 | Kondur | B61B 10/025 104/172.4 |
| 3,404,637 A | 10/1968 | Lerch | |
| 3,760,910 A | 9/1973 | Koshihara | |
| 3,780,663 A | 12/1973 | Pettit | |
| 3,854,406 A * | 12/1974 | Monne | B61C 13/04 104/108 |
| 3,908,792 A * | 9/1975 | Shortt | E01D 19/106 182/117 |
| 3,936,906 A | 2/1976 | Takazawa | |
| 3,985,082 A * | 10/1976 | Barac | A61H 3/008 104/62 |
| 3,995,561 A * | 12/1976 | Allor, Jr. | B61B 10/025 104/172.4 |
| 4,143,599 A * | 3/1979 | Krammer | B61B 10/025 104/103 |
| 4,172,423 A | 10/1979 | Monne | |
| 4,326,466 A * | 4/1982 | Parry | B61C 13/06 104/172.4 |
| 4,410,175 A | 10/1983 | Shamp | |
| 4,545,575 A | 10/1985 | Forjot | |
| 4,556,123 A * | 12/1985 | Hargest, III | A62B 1/02 182/10 |
| 4,861,021 A * | 8/1989 | Edwards | A61H 3/008 482/54 |
| 5,148,889 A | 9/1992 | Fenwick et al. | |
| 5,458,550 A * | 10/1995 | Braim | A47D 13/04 297/274 |
| 5,685,227 A | 11/1997 | Gaccetta et al. | |
| 5,939,857 A * | 8/1999 | Madigan | H02J 7/0027 320/107 |
| 6,148,580 A | 11/2000 | Weir | |
| 6,269,904 B1 | 8/2001 | Morhaus | |
| 6,334,507 B1 | 1/2002 | Westerweel | |
| 6,378,651 B1 | 4/2002 | Ecker | |
| 6,390,952 B1 | 5/2002 | Wilson | |
| 6,467,574 B2 | 10/2002 | Lara | |
| 6,488,118 B1 | 12/2002 | Corriveau | |
| 6,547,033 B1 | 4/2003 | Cheval | |
| 6,837,337 B2 | 1/2005 | Thomas et al. | |
| 6,910,425 B2 | 6/2005 | Galpin | |
| 7,111,707 B2 | 9/2006 | Reeves | |
| 7,137,481 B2 | 11/2006 | Petzl | |
| 7,341,159 B2 | 3/2008 | Nelson | |
| 7,347,300 B2 | 3/2008 | Renton | |
| 7,377,377 B2 | 5/2008 | Christiansson | |
| 7,413,394 B2 | 8/2008 | Risser | |
| 7,484,461 B2 | 2/2009 | Britcher | |
| 7,634,825 B2 * | 12/2009 | Chepurny | A61G 7/1015 5/83.1 |
| 7,757,813 B2 * | 7/2010 | Kerr | E06C 1/397 182/36 |
| 7,828,115 B2 | 11/2010 | Sayles | |
| 7,992,680 B2 | 8/2011 | Small | |
| 8,001,904 B2 | 8/2011 | Maes et al. | |
| 8,156,874 B2 * | 4/2012 | Hansen | A61G 7/1042 105/153 |
| 8,296,878 B2 * | 10/2012 | Imhoff | A61G 7/1042 188/43 |
| 8,650,675 B2 | 2/2014 | Imhoff | |
| 2001/0027149 A1 | 10/2001 | Bingham | |
| 2002/0046903 A1 | 4/2002 | Strickler | |
| 2004/0238277 A1 | 12/2004 | Kruse | |
| 2006/0156944 A1 | 7/2006 | Vetesnik | |
| 2007/0089634 A1 * | 4/2007 | Adam | B61B 3/00 104/91 |
| 2009/0308828 A1 * | 12/2009 | Hansen | A61G 7/1042 212/320 |
| 2012/0000876 A1 * | 1/2012 | Bergenstrale | A61G 7/1042 212/336 |

* cited by examiner

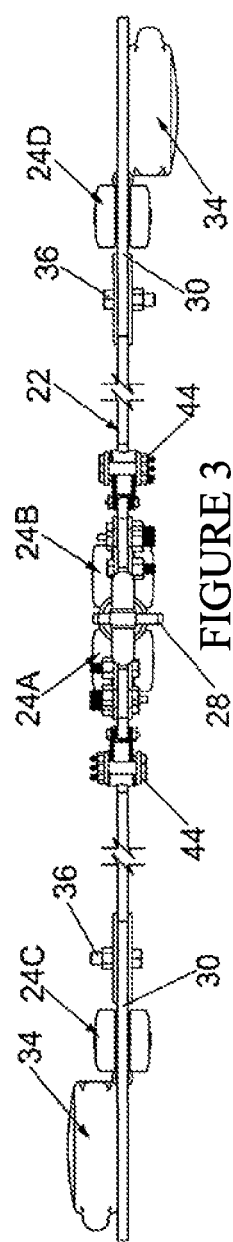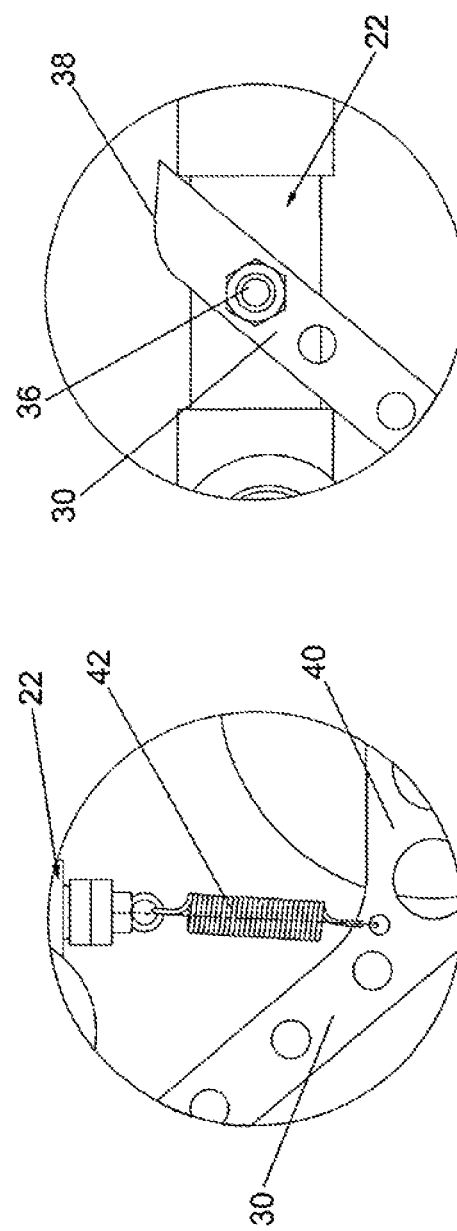

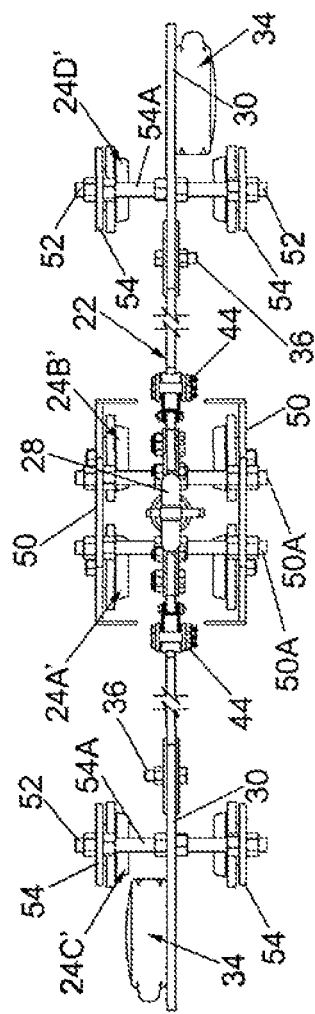
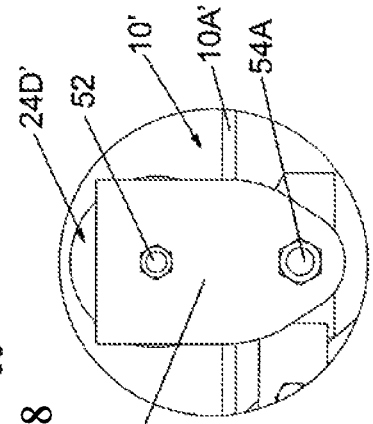
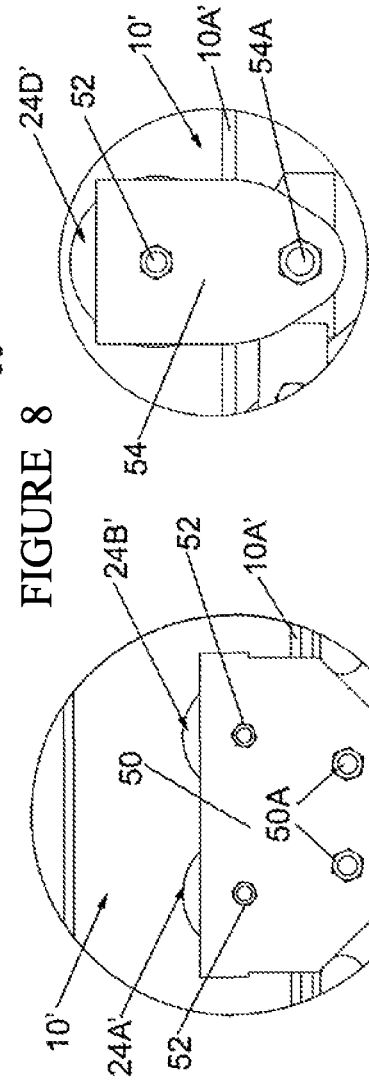

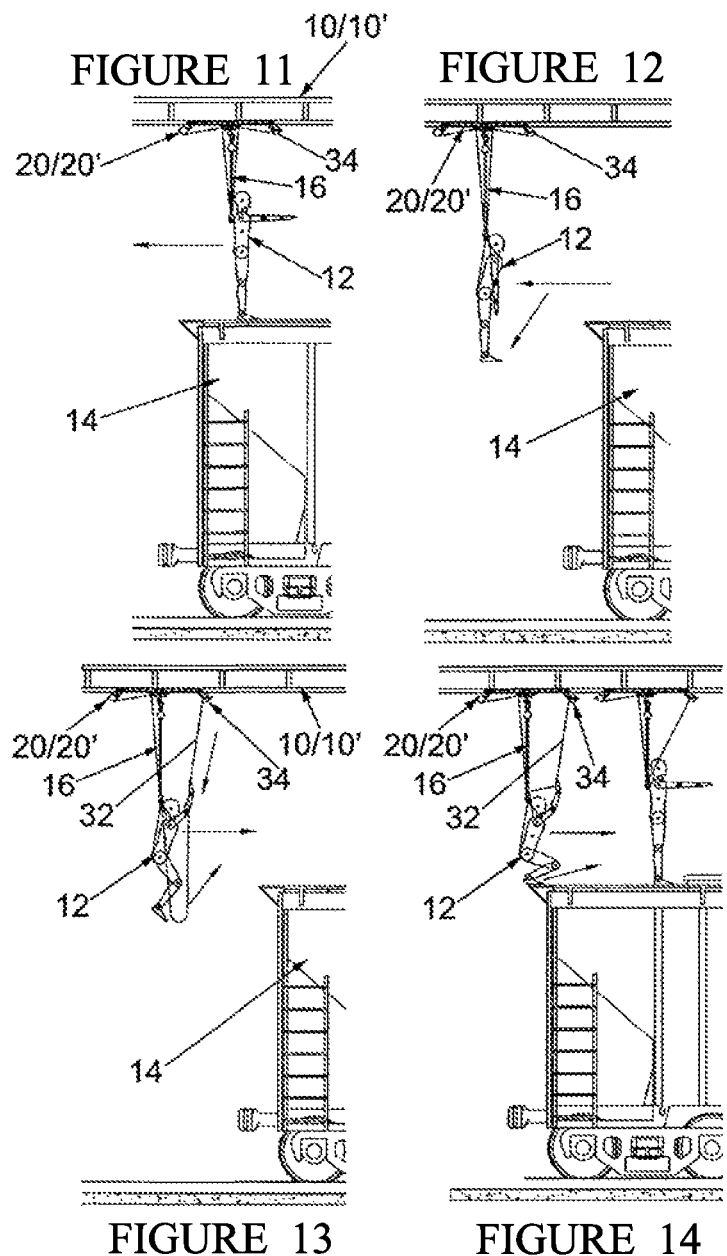

ANCHOR TROLLEY AND FALL ARREST SYSTEM AND METHOD IMPLEMENTING THE SAME

CROSS-REFERENCE TO RELATED APPLICATIONS

The present application is a continuation of U.S. patent application Ser. No. 13/686,713, filed Nov. 27, 2012, which: (1) claims the benefit of U.S. Provisional Application Ser. No. 61/580,940, filed Dec. 28, 2011; and (2) is a continuation-in-part of U.S. patent application Ser. No. 12/500,897, filed Jul. 10, 2009 (now U.S. Pat. No. 8,316,990), the entireties of which are hereby incorporated by reference.

FIELD OF THE INVENTION

The present invention relates generally to a fall protection apparatus, system, and or method, and more specifically to a fall protection system that arrests longitudinal movement of a trolley along a rail upon a user falling from a work surface and a method of arresting movement of a worker after falling off an edge of a work surface.

BACKGROUND OF THE INVENTION

Many work situations require workers to be positioned on top of platforms or vehicles that cannot be practically protected by a guardrail system enclosing the work surface. To prevent the workers from falling from such elevated positions and thereby sustaining serious or fatal injuries, various fall protection systems can be used. In general, fall arrest or fall protection systems are designed to prevent the worker from reaching an unprotected edge or to quickly stop a fall before the worker impacts a lower level. Such systems typically include a trolley secured to a structure overhead the work surface, a safety harness worn by the worker, and a lanyard interconnecting the trolley to the harness.

In using conventional fall arrest or fall protection systems, workers who fall from the work surface are carried by momentum a distance from the work surface. As a result, workers are left hanging from the trolley and lanyard until a third party or rescue team arrives at the scene to assist the worker. This can be extremely undesirable because if a worker is left hanging for an extended period of time, the worker may suffer from orthostatic intolerance or suspension trauma.

Thus, a need exists for a fall arrest apparatus, system and/or method that prevents a worker who falls from a work surface from suffering orthostatic intolerance and negates the need for third party assistance to rescue the worker.

BRIEF SUMMARY OF THE INVENTION

These and other needs are met by the present invention, which is directed to a fall arrest apparatus, system and method. In one aspect, the invention can be a fall arrest system comprising: a rail extending along a longitudinal axis, the rail comprising a floor and a longitudinal slot separating the floor into a first longitudinal section and a second longitudinal section; a trolley comprising a body, a brake sub-system, and a plurality of wheels rotatably coupled to the body, the plurality of wheels in rolling contact with upper surfaces of the first and second longitudinal sections; the brake sub-system comprising a brake rod, a brake pad connected to the brake rod, a lanyard connector connected to the brake rod, and a resilient element, the brake pad positioned above the first and second longitudinal sections; the brake rod slidably coupled to the body so that the brake sub-system is alterable between: (1) an arrest state in which the brake pad frictionally engages the upper surfaces of the of the first and second longitudinal sections of the rail to prohibit rolling movement of the trolley along the rail; and (2) a free state in which the brake pad is spaced a distance above the upper surfaces of the first and second longitudinal sections of the rail to allow rolling movement of the trolley along the rail; and the resilient element biasing the brake sub-system into the free state.

In another aspect, the invention can be a fall arrest trolley comprising: a body, a brake sub-system, and a plurality of wheels rotatably coupled to the body, wherein bottoms of the plurality of wheels collectively define a rolling plane; the brake sub-system comprising a brake rod, a brake pad connected to the brake rod, a lanyard connector connected to the brake rod, and a resilient element; the brake rod slidably coupled to the body so that the brake sub-system is alterable between: (1) a free state in which the brake pad is spaced a distance above the rolling plane; and (2) an arrest state in which at least a portion of the brake pad is located within the rolling plane; the resilient element biasing the brake sub-system into the free state.

In yet another aspect, the invention can be a method of arresting a user from falling off an edge of a work surface comprising: a) coupling a first end of a lanyard to a lanyard connector of a fall arrest trolley, the fall arrest trolley comprising a plurality of wheels in rolling contact with an upper surface of a rail extending along a longitudinal axis; b) upon a user moving on the work surface, the fall arrest trolley rolling along the upper surface of the rail, the trolley comprising a brake sub-system comprising, a brake rod, a brake pad connected to the brake rod and located above the upper surface of the rail, the lanyard connector connected to the brake rod, and a resilient element, wherein the resilient element biases the brake sub-system into a free state in which the brake pad is spaced a distance above the upper surface of the rail to allow the rolling of the trolley along the rail while the user moves on the work surface; and c) upon the user moving off the edge of the work surface, the user's weight exerting a downward vertical force on the lanyard connector that overcomes a spring force of the resilient member and alters the brake sub-system into an arrest state in which the brake pad frictionally engages the upper surface of the rail to prohibit further rolling of the trolley along the rail.

In a still further aspect, the invention can be a trolley for movement along an elevated track to support a person who has fallen off of a structure adjacent the track, said trolley comprising a frame having at least one roller, a connector mounted on the frame, and a trolley immobilizing assembly mounted on the frame, said at least one roller enabling said trolley to roll along a surface of the track in a longitudinal direction, said connector having a lanyard releasably secured thereto, the lanyard connected to a safety harness to be worn by the person and to suspend the person from said trolley, said trolley immobilizing assembly comprising a movable engagement member and a flexible strap, said movable engagement member being biased in a position away from the track, wherein pulling on said strap causes the movable engagement member to be pulled into engagement with the track thereby releasably fixing said trolley at a fixed longitudinal position on the track so that the person can swing below said trolley while fixed in the fixed longitudinal position on the track, and wherein releasing said strap causes the movable engagement member to return to the biased position thereby releasing the trolley from the fixed longitudinal position on the track so that momentum of the swing of the person moves said trolley along the track to another longitudinal position thereon.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a top plan view, partially broken away, of the trolley shown in FIG. 1;

FIG. 4 is an enlarged side elevation view of the portion of the trolley shown within the circle 4 in FIG. 2;

FIG. 5 is an enlarged side elevation view of the portion of the trolley shown within the circle 5 in FIG. 2;

FIG. 8 is a top plan view, partially broken away, of the trolley shown in FIG. 7;

FIG. 9 is an enlarged side elevation view of the portion of the trolley shown within the circle 9 in FIG. 7;

FIG. 10 is an enlarged side elevation view of the portion of the trolley shown within the circle 10 in FIG. 7; and FIG. 11-14 are a series of illustrations showing an exemplary use of a fall arrest, safety system including a trolley constructed in accordance with this invention.

DETAILED DESCRIPTION OF THE INVENTION

Figure 1:
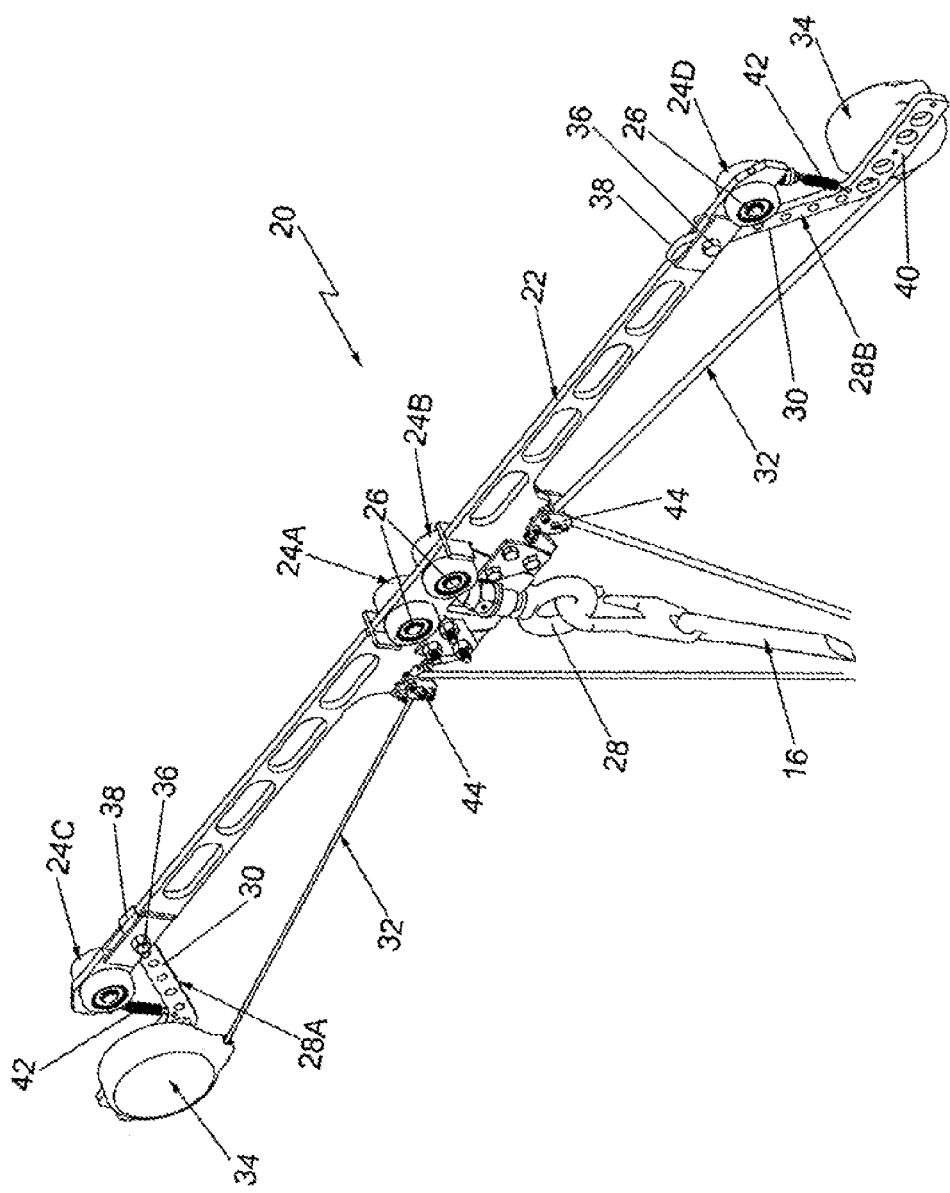
FIG. 1 is an isometric view showing one exemplary embodiment of a fall arrest self rescuing trolley constructed in accordance with this invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Two structural embodiments of fall arrest systems are disclosed herein that are directed to eliminating a situation where a worker becomes stranded while hanging from a trolley and/or rail system after falling from a work surface. Specifically, the first structural embodiment is a fall arrest self-rescue trolley system and the second structural embodiment is a fall arrest anchor trolley system. Each of these structural embodiments will be discussed in detail below, wherein FIGS. 1-14 and the accompanying description disclose the fall arrest self-rescue trolley system and FIGS. 15-25 and the accompanying description disclose the fall arrest anchor trolley system.

Fall Arrest Self Rescue Trolley

Referring to FIGS. 1-14, a fall arrest self rescue trolley 20 will be described in accordance with an embodiment of the invention. The description of the fall arrest self rescue trolley 20 and the system within which that trolley operates will be made with reference to FIGS. 1-14.

Referring first to FIG. 1, one exemplary embodiment of a fall arrest self rescue trolley 20 of a fall arrest safety system constructed in accordance with this invention is illustrated. The trolley 20 is arranged for mounting and movement along an elevated track 10 (FIGS. 2 and 2A) located adjacent the structure e.g., rail car 14 (FIGS. 11-14) on which a worker 12 is working and serves to support the worker in case he/she falls off of the structure to prevent the worker from being injured in the fall. To that end, a conventional retractable lanyard 16 (FIGS. 11-14) and a conventional safety harness (not shown) worn by the worker is connected to the trolley 20. The lanyard, harness and elevated track form a portion of the fall arrest safety system. Unlike prior art trolleys, each trolley of this invention is constructed so that the worker can operate the trolley to move himself/herself from the position at which he/she is suspended after a fall to some other position, e.g., a safety position from which the worker can descend, all without requiring the help or assistance of anyone else.

Figures 2, 2A, 2B:
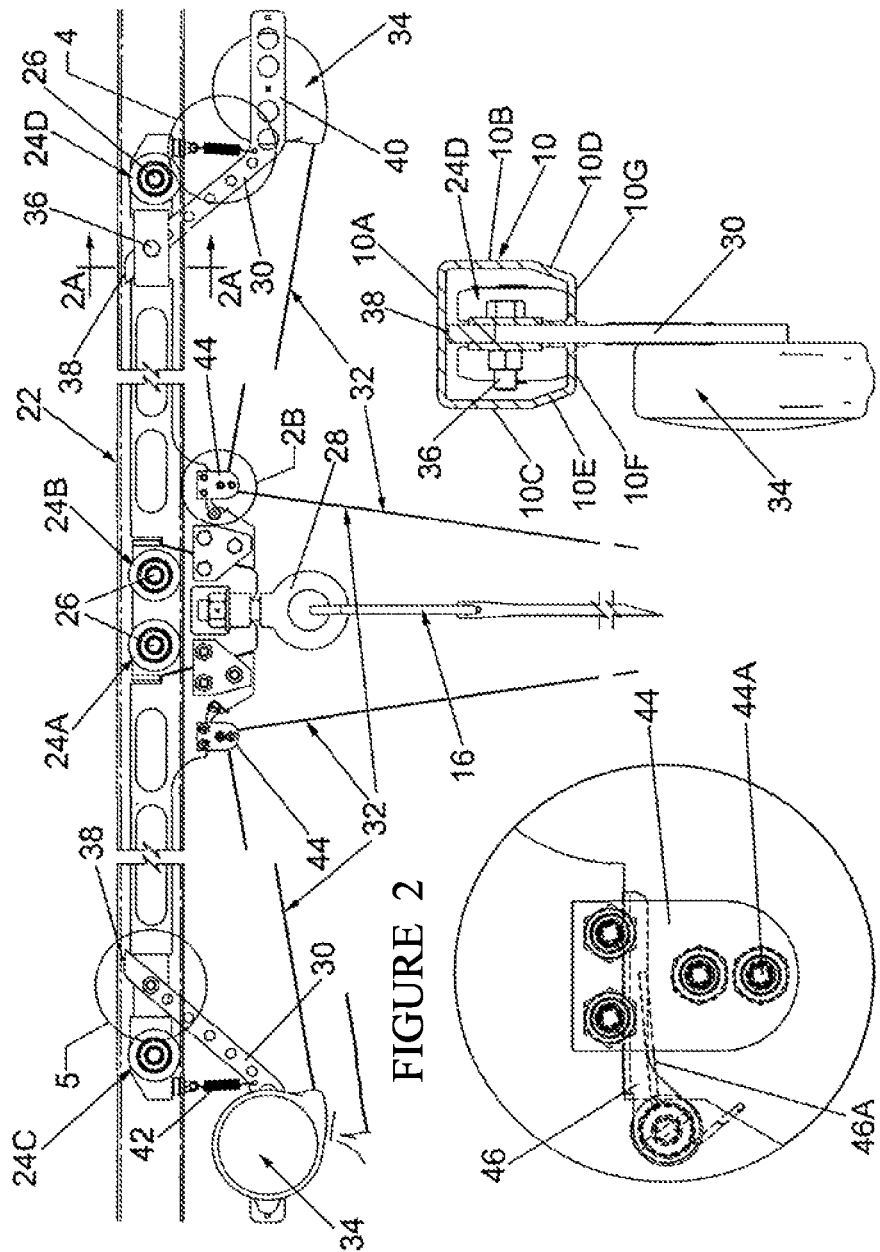
FIG. 2 is a side elevation view partially broken away of the trolley shown in FIG. 1 mounted on an enclosed track.
FIG. 2A is an enlarged sectional view taken along line 2A-2A of FIG. 2.
FIG. 2B is an enlarged side elevation view of the portion of the trolley shown within the circle 2B in FIG. 2.

As best seen in FIGS. 1 and 2 the trolley 20 basically comprises an elongated frame 22 formed of any suitable strong material, e.g., steel, aluminum, etc. The frame 22 includes a central section on which two pairs of rollers 24A and 24B are mounted via respective axles 26. Another pair of similarly constructed rollers 24C is mounted at one end of the frame and still another pair of similarly constructed rollers 24D is mounted at the opposite end of the frame. Each of the rollers of each pair is formed of a tough, wear resistant material, such as polyamide, but can be formed of any other material used in conventional enclosed track trolleys.

Each of the rollers of each pair is arranged to roll on a respective flange portion of the elevated track 10. In particular, as best seen in FIG. 2A, the track 10 is of a conventional "enclosed-type" construction. One particularly suitable enclosed track is that sold by SPANCO, a division of Transol Corporation, the assignee of this invention. The track 10 is an elongated member that is formed of a strong material, e.g., steel, and has a horizontally disposed top wall 10A, a pair of vertical sidewalls 10B and 10C projecting downward from the top wall, a pair of angularly located sidewalls 10D and 10E located below the vertical sidewalls, respectively, and a pair of horizontally disposed flanges 10F and 10G projecting inward from the ends of the angularly located sidewalls, respectively, to form a slot therebetween. The track 10 is arranged to support the trolley 20 to enable the trolley to be moved along the track to any desired longitudinal position by the user (as will be described later). In particular, the rollers of the pair 24D are arranged to roll along respective flanges 10F and 10G of the track 10. In a similar manner the rollers of the pair 24C are arranged to roll along respective flanges 10F and 10G of the track 10, while the rollers of the pair 24A and the rollers of the pair 24B also roll along respective flanges 10F and 10G of the track. Thus, the trolley 20 can be moved (rolled) to any longitudinal position along the length of the track 10.

A swivel eyelet 28 is mounted on the frame 22 immediately below the central roller pairs 24A and 24B. The eyelet 28 serves as the connection point to which a conventional retractable lanyard 16 and its associated safety harness (not shown) may be secured, as best seen in FIGS. 1 and 2. Thus, when a worker 12 is wearing a safety harness that is connected via a retractable lanyard 16 to the eyelet 28, he/she will be protected from injury in the event of a fall. In such an event the retractable lanyard will act in its normal manner to arrest the fall, whereupon the worker will be suspended from the trolley 20 at the particular longitudinal position on the track that the trolley is located when the worker's fall is arrested.

As mentioned earlier, the trolley 20 of this invention is arranged to be operated by a worker suspended from it to move it along the track to a position of safety. To that end, the trolley 20 includes at least one trolley immobilizing assembly which is arranged when actuated to fix or immobilize the trolley on the track and to hold the trolley in that position until its release is desired. In the exemplary embodiments shown herein each trolley includes two trolley immobilizing assemblies 28A and 28B. Each of these exemplary assemblies serves to releasably engage the track when operated to releasably fix the trolley in position on the track to enable the suspended worker to pull himself/herself along the track. In particular, one track engaging assembly 28A is mounted on the frame 22 at one end thereof to enable a suspended worker to move in the direction toward that end of the trolley, while the other and identically constructed track engaging assembly 28B is mounted on the opposite end of the frame 22 to enable a suspended worker to move in the direction toward the opposite end of the trolley.

The track engaging assemblies 28A and 28B are identical in construction and operation and each assembly basically comprises a movable frictional engagement member 30, a flexible strap 32 and a retractor 34. The movable frictional engagement member 30 is in the form of a locking bar which is pivotally mounted adjacent a respective end of the frame 22 via a respective pivot pin, e.g., a bolt 36. Each locking bar 30 includes an arcuate working end 38 (FIG. 5) which is arranged to be pivoted into frictional engagement with a portion of the inside surface of the top wall 10A of the track 10. The opposite end of each locking bar 30 is in the form of an angularly extending arm 40. A respective tension spring 42 (FIG. 4) is provided to normally bias its associated locking bar so that the working end 38 of that locking bar is spaced from and not in frictional engagement with the top wall 10A of the track 10. As best seen in FIG. 4, each biasing spring 42 is mounted between the associated free end of the frame 22 and the point on the associated locking bar from which the arm 40 extends.

Each locking bar 30 is arranged to be pivoted by the user (i.e., a suspended worker) by means of the strap 32 into its operative orientation wherein its free end frictionally engages the top wall of the track. To that end, one strap 32 extends from a point at which it is affixed to the retractable lanyard 16 to the retractor 34 at one end of the frame 22. The other strap extends from a point at which it is affixed to the retractable lanyard 16 to the retractor 34 at the opposite end of the frame 22. Each retractor is mounted adjacent the free end of the arm 40 of the associated locking bar and basically comprises an internal reel on which a portion of the associated strap 32 is wound. The reel is internally biased so as to naturally wind up the strap on it.

In order to keep each strap out of the way of the worker (to stow the strap) until it is necessary to use it, the trolley 20 includes a pair of releasable guide assemblies 44 (FIG. 2B), each of which includes a pin 44A over which a portion of the associated strap 32 extends. In particular, one guide assembly 44 is mounted on the frame 22 below and slightly beyond the center roller pair 24A and the other guide assembly is mounted on the frame below and slightly beyond the center roller pair 24B. Thus, each of the straps 32 extends generally horizontally close to the track 10 from its associated retractor over the pin 44A of the associated guide assembly 44 and from that point downward generally vertically close to the retractable lanyard 16 to its connection point (not shown) on the lanyard. Each guide assembly 44 is releasably secured to the frame 22 by a respective pivotable finger 46 which is biased by a spring 46A.

Figure 6:
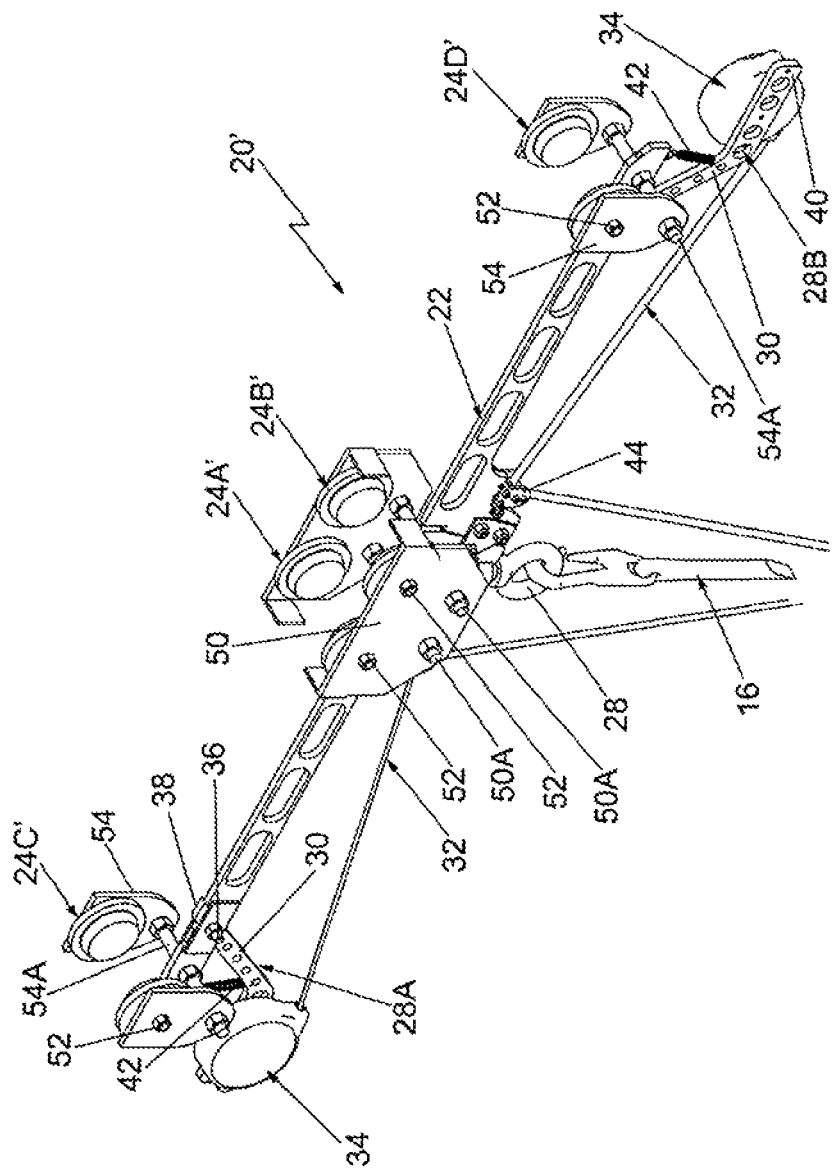
FIG. 6 is an isometric view showing another exemplary fall arrest self rescuing trolley constructed in accordance with this invention, i.e., a trolley for use on an I-beam.
Figure 7:
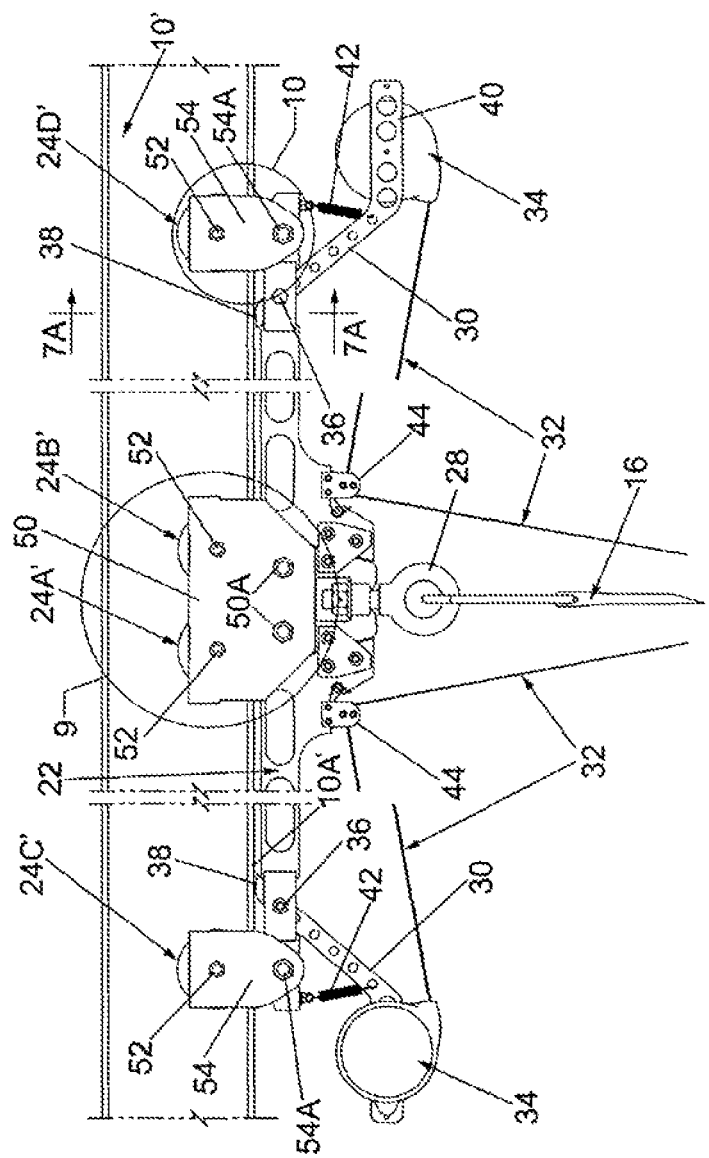
FIG. 7 is a side elevation view partially broken away, of the trolley shown in FIG. 6 mounted on an I-beam.
Figure 7A:
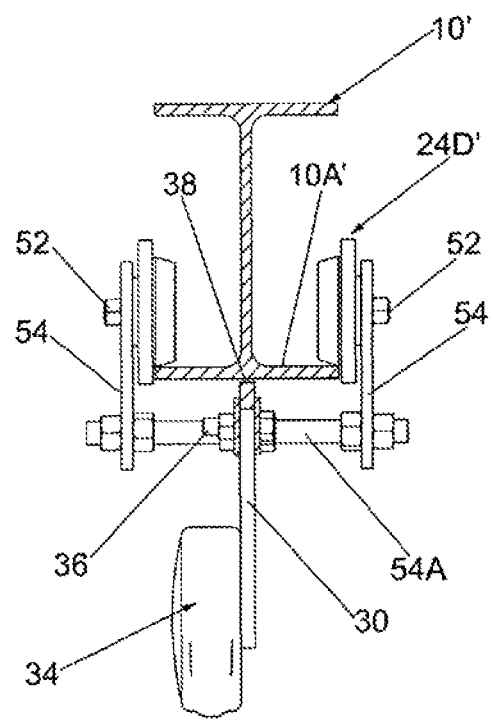
FIG. 7A is an enlarged sectional view taken along line 7A-7A of FIG. 7.

Referring now to FIGS. 6-10, the details of an alternative embodiment of a trolley 20' constructed in accordance with this invention will now be described. The trolley 20' is arranged for use on an I-beam type of track 10', like shown in FIG. 7A, and is of the same basic construction as the trolley 20, except for the rollers and their mountings. In the interest of brevity the common components of the trolleys 20 and 20' will be given the same reference numbers and a description of their construction and operation will not be reiterated. Thus as can be seen in FIGS. 6 and 7, the frame 22 of the trolley 20' includes a central section on which two pairs of rollers 24A' and 24B' are mounted via respective axles mounting plates 50 and associated axle bolts 52. The plates are held together by a pair of threaded rods 50A. Another pair of similarly constructed rollers 24C' is mounted at one end of the frame via respective mounting plates 54 and axle bolts 52. The plates 54 are held together by a threaded rod 54A. Still another pair of similarly constructed rollers 24D' is mounted in a similar manner at the opposite end of the frame 22. Each of the rollers of each pair is formed of a tough, wear resistant material, such as polyamide, but can be formed of any other material used in conventional enclosed track trolleys. Each of the rollers of each pair is contoured and arranged to roll on the edge of a respective lower flange portion of the I-beam that forms the elevated track 10' as shown clearly in FIG. 7A.

Operation of a trolley constructed in accordance with this invention will now be described with reference to the illustrations in FIGS. 11-14. In particular, those figures show the use of a system to protect a worker 12 from falling off of a railroad car 14. The worker 12 is wearing a conventional harness (not shown) that is connected by a conventional self-retractable lanyard 16 to the trolley 20/20'. The trolley in this example is shown mounted on an elevated track 10/10'. The track can be of the enclosed track type like shown in FIGS. 1-5 or can be of the I-beam type like shown in FIGS. 6-10, or on other types of beams, such as H-beams, W-beams (for "wide flange"), rolled steel joist (RSJ), or double-T, or can be used on an on any other elongated support member having a flange or surface along which the roller(s) of a trolley constructed in accordance with this invention can roll.

In the exemplary use of the trolley 20/20' shown in FIGS. 11-14, it shall be assumed that the worker 12 is working on the top of the rail car 14, as shown in FIG. 11, and has moved too close to the edge of the rail car so that he/she slips and loses his/her balance and falls off of the rail car. The person is prevented from falling to the ground, i.e., his/her fall is arrested, by the safety harness and lanyard that are connected to the trolley 20/20'. It is likely that the momentum of the person falling off of the back of the rail car will push the person away from the rail car (and hence from safety) as shown by the arrows in FIG. 12. If the trolley suspending the person is of a conventional type, the person would be stuck in that position out of reach of the rail car so that there would be nothing for him to grab onto to push or pull on to safety. In contradistinction, the fall arrest self rescue trolleys of this invention enable the suspended worker to readily move himself/herself along the track 10/10' back to some safe location, e.g., the rail car or some other structure adjacent to the track. To that end, once the person's fall has been arrested, the person merely has to reach up to activate a respective one of the track engaging assemblies as shown in FIG. 13. In particular, the person pulls on the strap 32 that is facing in the direction that he/she wishes to move, e.g., in the direction of the horizontal arrow shown in FIG. 13. Pulling on that strap causes it to unreel from its associated retractor 34. When the strap has been fully unreeled from the retractor, further pulling on the strap applies a downward force on the spring biased retaining finger 46 (FIG. 2B). This action overcomes the bias on the finger, whereupon it pivots downward to release the guide assembly 44, whereupon the guide assembly falls away. Further pulling on the strap 32 by the person causes it to pivot the associated locking bar 30 about the bolt 36, whereupon the working end 36 of the locking bar moves into frictional engagement with the top wall 10A/bottom flange 10A' of the track. This action effectively locks the trolley in place giving the person an anchor point to which he/she can pull himself/herself. In particular, the person merely has to pull on the strap and swing himself/herself forward toward the anchored end of the trolley, e.g., toward the rail car as shown by the arrows in FIG. 13. Once the swing begins the person can release the strap 32, whereupon the bias of the spring 42 causes the locking bar 30 to pivot back, i.e., disengage, from the track 10/10' so that the momentum of the swing of the person moves the trolley 20 along the track to a longitudinal position closer to desired direction of travel, e.g., toward the rail car. This action can be repeated as often as necessary until the person reaches the rail car. At that point all that the person has to do is to pull on the strap 32 to reengage the locking bar. Once so engaged, the person can pull himself/herself back up on the rail car by pulling on the strap 32 as shown in FIG. 14.

It should be pointed out that while the member for pulling the locking arm into frictional engagement with the track has been disclosed as being a strap, such a component is merely exemplary of various elongated flexible members which can be used, e.g., cables, straps, filaments, etc. Thus, the use of the term strap herein is meant to cover such alternative components. Moreover, while the use of retractors, guides and associated components to hold the straps out of the way of the worker until necessary, is preferable, it is not mandatory. Thus, trolleys can be constructed in accordance with this invention without any such means for stowing the straps.

Further still, while the mechanism to releasably lock the trolley in position has been shown and described as being manually actuable (e.g., the straps arranged to be pulled by a suspended worker), it should be clear that any suitable automatic means can be used in lieu of the manually actuable means. Moreover, the mechanisms for releasably locking the trolley in position need not be limited to those assemblies that frictionally engage the track. In fact, the assemblies for releasably locking the trolley in position on the track need not engage the track at all, e.g., such assemblies may prevent rolling of the trolley on the track by locking one or more of the rollers via an actuatable brake, wheel chock or other device for preventing the trolley from rolling along the track.

As should be appreciated by those skilled in the art from the foregoing, the trolleys of this invention can be original equipment or may be produced by retrofitting existing rollable trolleys with one or more trolley immobilizing assemblies constructed in accordance with this invention to releasably fix the trolley in position on a track when such action is desirable.

Fall Arrest Anchor Trolley:

Referring to FIGS. 15-25, a fall arrest anchor trolley 100 within a fall arrest system 500 is illustrated. The description of the fall arrest anchor trolley 100 and system below will be made with reference to FIGS. 15-25.

Figure 15:
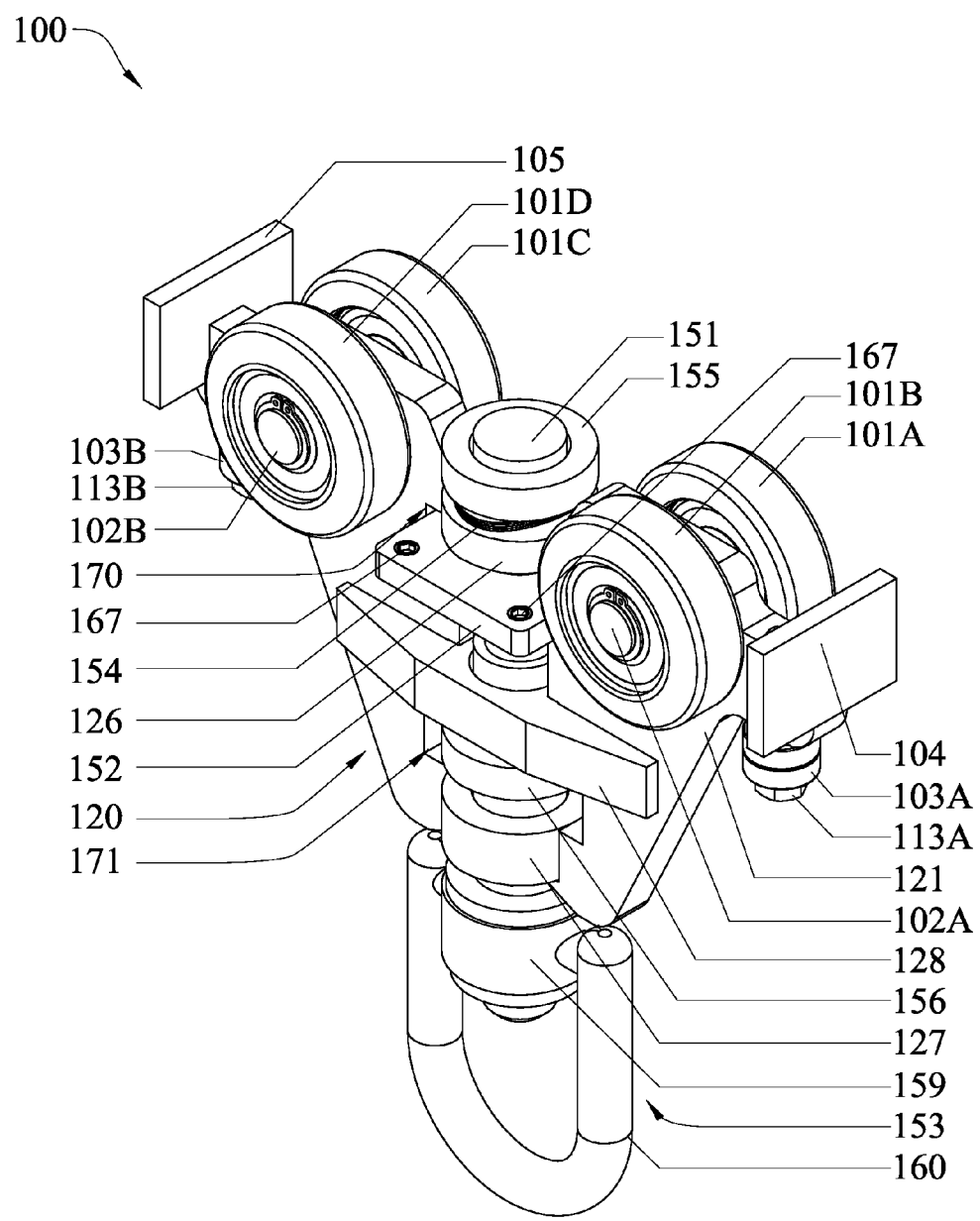
FIG. 15 is a perspective view of a fall arrest anchor trolley in accordance with another embodiment of the present invention.
Figure 16:
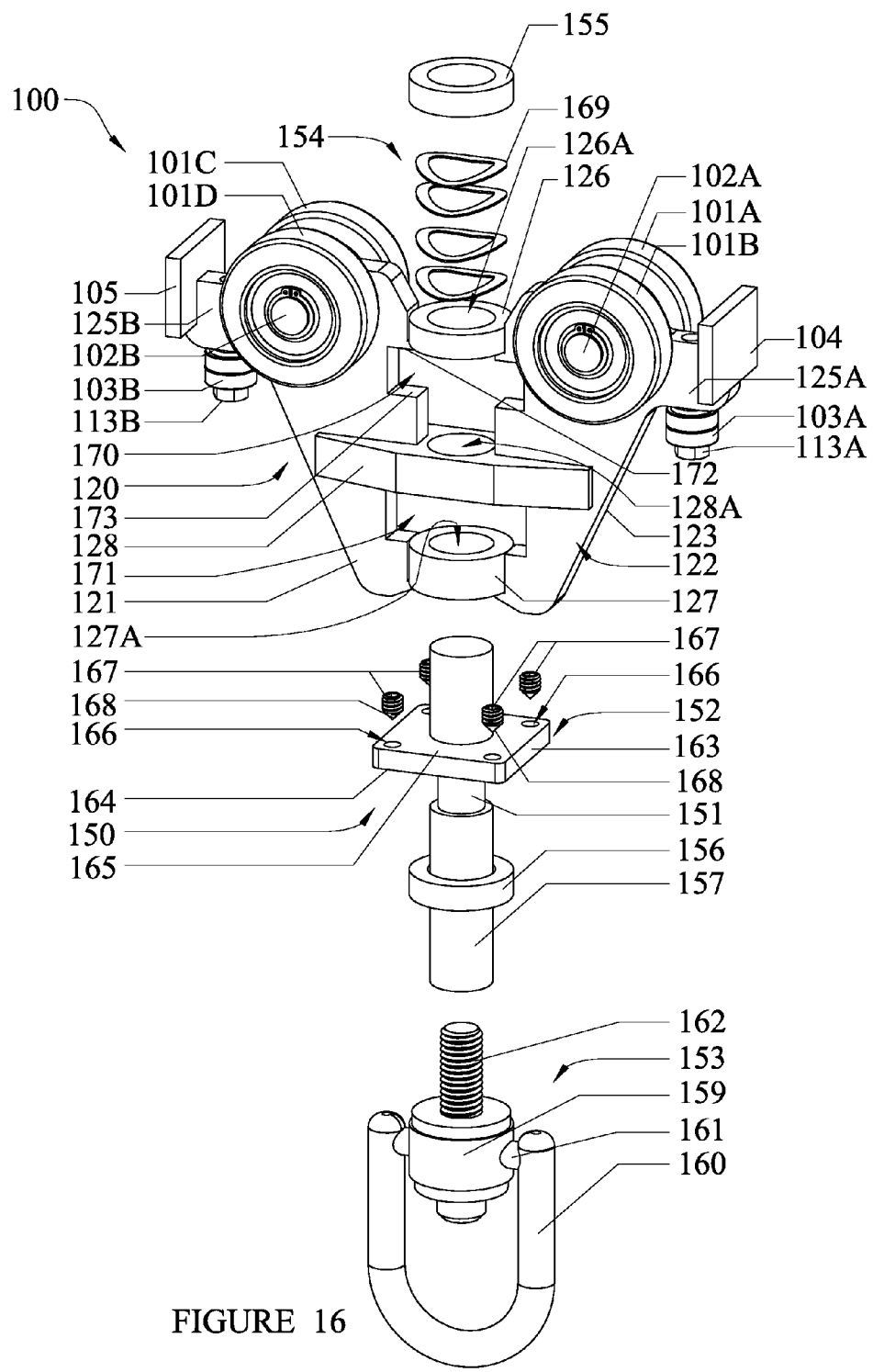
FIG. 16 is an exploded view of the fall arrest anchor trolley of FIG. 15.
Figure 17:
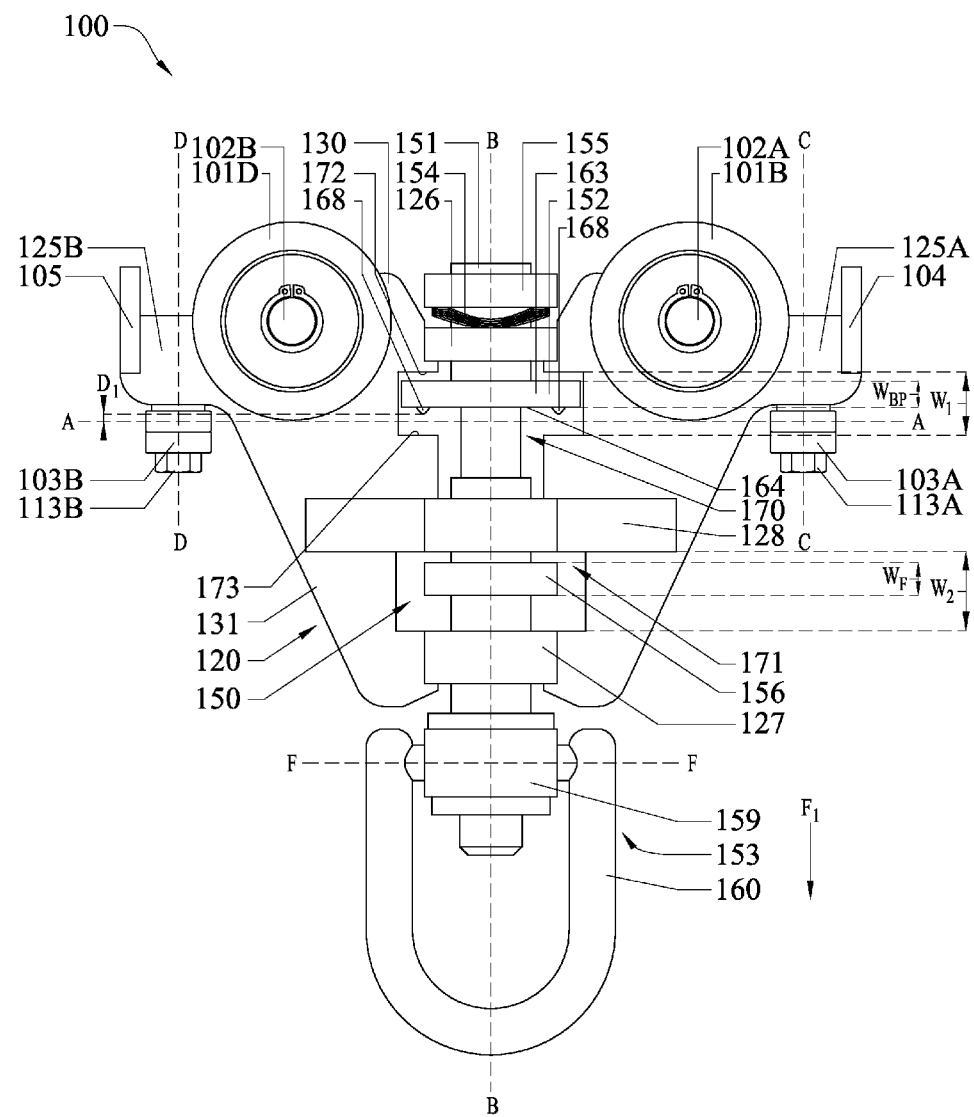
FIG. 17 is a side view of the fall arrest anchor trolley of FIG. 15.

Referring to FIGS. 15-17 concurrently, the fall arrest trolley 100 will be described in accordance with an embodiment of the present invention. The trolley 100 generally comprises a body 120, a brake-sub system 150 and a plurality of wheels 101A-D rotatably coupled to the body 120. The body 120 comprises a primary plate 121 having a first side surface 122 and an opposing second side surface 123. In the exemplified embodiment, the first and second side surfaces 122, 123 of the primary plate 121 are substantially flat surfaces. However, the invention is not to be so limited in all embodiments and in certain other embodiments the first and second side surfaces 122, 123 of the primary plate 121 can have ridges, recesses and other contours as desired. In certain embodiments, the primary plate 121 of the body 120 is formed of a rigid metallic material, such as steel, iron, brass, aluminum alloys or the like. Of course, the invention is not to be so limited in all embodiments and materials other than metal can be used in other embodiments.

In the exemplified embodiment, the primary plate 121 is generally in the shape of a trapezoid or truncated triangle with a first flange 125A at a first end thereof and a second flange 125B at a second opposite end thereof. The primary plate 121 has various openings and/or slots throughout its central portion for attachment to collars of the body 120 and for slidably receiving therein flanges of the brake sub-system 150 as will be described in more detail below. It should be appreciated that the exact shape of the primary plate 121 is not to be limiting of the present invention in all embodiments and the primary plate 121 may take on any other shapes that enable the trolley 100 to function as described herein.

The body 120 comprises a first collar 126, a second collar 127 and a third collar 128. Each of the first, second and third collars 126, 127, 128 can be integrally formed with the body 120, or can be formed separately from the body 120 and connected to the body 120 at a later stage in the manufacturing process such as by welding, adhesion, interference fit, snap fit or the like. The first collar 126 has a first central opening 126A, the second collar 127 has a second central opening 127A and the third collar 128 has a third central opening 128A. In the exemplified embodiment, each of the first, second and third central openings 126A, 127A, 128A are axially aligned along a brake axis B-B. However, the invention is not to be so limited in all embodiments and in certain other embodiments the first, second and third central openings 126A, 127A, 128A may be axially offset. The body 120 is bilaterally symmetric about the brake axis B-B in the exemplified embodiment, although the invention is not to be so limited in all embodiments of the invention.

Moreover, in the exemplified embodiment each of the first, second and third central openings 126A, 127A, 128A have transverse cross-sectional areas (transverse to the brake axis B-B) that are circular or cylindrical in shape. However, the invention is not to be so limited in all embodiments and in certain other embodiments the openings 126A-128A may take on other transverse cross-sectional shapes to correspond to the shape of the brake sub-system 150 (and more specifically to a brake rod 151 of the brake sub-system) as described herein below. Furthermore, in still other embodiments the transverse cross-sectional shapes of the first, second and third central openings 126A, 127A, 128A may merely be able to slidably receive the brake sub-system 150 without actually having a shape that corresponds to the shape of the brake sub-system 150. For example without limitation, in certain embodiments the transverse cross-sectional shapes of the first, second and third central openings 126A, 127A, 128A may be rectangular while the brake sub-system 150 is cylindrical. Thus, in certain other embodiments the transverse cross-sectional shapes of the first, second and third openings 126A, 127A, 128A are merely sized, shaped and configured to slidably receive the brake sub-system 150 therein.

Moreover, in the exemplified embodiment, the first and second collars 126, 127 are cylindrical in shape and the third collar 128 is octagonal in shape. However, it should be appreciated that the general shapes of the first, second and third collars 126, 127, 128 are not to be limiting of the present invention in all embodiments unless so specified in the claims.

Referring briefly to FIGS. 15-17 and 20, the wheels 101A-D are rotatably coupled to the body 120 by a first axle 102A and a second axle 102B. The first and second axles 102A, 102B are longitudinally spaced from one another. In certain embodiments, the wheels 101A-D can be held in place on their associated axles 102A, 102B by snap-rings, although the invention is not to be so limited in all embodiments and other structures or mechanisms may be used to maintain the wheels 101A-D in place on the axles 102A, 102B. In certain embodiments, the axles 102A, 102B are fixedly mounted on the body 120 of the trolley 100. However, the invention is not to be so limited and in certain other embodiments the axles 102A, 102B may be separate components that are welded or otherwise coupled to the body 120 of the trolley 100 such as by an interference or snap-fit arrangement.

In the exemplified embodiment, four wheels 101A-D are illustrated. However, the invention is not to be so limited and more or less than four wheels can be used in other embodiments of the invention. The wheels 101A-D are rotatable about an axis E-E. Specifically, the trolley 100 has two sets of wheels wherein the first set of wheels 101a, 101B are coupled to the body 120 and to each other by the first axle 102A and the second set of wheels 101C, 101D are coupled to the body 120 and to each other by the second axle 102B. In certain embodiments, the wheels 101A-D are formed of a tough, wear resistant material, such as polyamide. However, the invention is not to be so limited in all embodiments and in certain other embodiments the wheels 101A-D can be formed of any other material known to be used with trolley assemblies, such as for example without limitation plastic materials, rubber, elastomeric materials, thermoplastic elastomers, wood or metal.

Referring again to FIGS. 15-17, bottoms of the plurality of wheels 101A-D collectively define a rolling plane A-A. In the exemplified embodiment, the rolling plane A-A is illustrated with a dotted line. However, it should be understood that the dotted line showing the rolling plane A-A is a plane that is perpendicular to the page on which the figures are illustrated and that the rolling plane A-A is collectively formed by all four of the plurality of wheels 101A-D. The body 120 comprises a first portion 130 that is located above the rolling plane A-A and a second portion 131 that is located below the rolling plane A-A. Thus, the body 120 extends through the rolling plane A-A. Furthermore, the primary plate 121 of the body 120 is oriented substantially perpendicular to the rolling plane A-A.

The trolley 100 comprises a first stop member 104 located at a first longitudinal end of the body 120 and a second stop member 105 located at a second longitudinal end of the body 120. Specifically, the first stop member 104 is connected to the first flange 125A of the primary plate 121 of the body 120 and the second stop member 105 is connected to the second flange 125B of the primary plate 121 of the body 120. The plurality of wheels 101A-D are each located between the first and second stop members 104, 105. In the exemplified embodiment, the first and second stop members 104, 105 are rectangular shaped plates that form the ends of the body 120. Of course, the first and second stop members 104, 105 can take on other shapes in certain other embodiments. The first and second stop members 104, 105 provide a flat surface of the trolley 100 to contact an end of a rail when the trolley 100 is positioned within a rail as will be described in more detail below with reference to FIG. 18. Thus, the first and second stop members 104, 105 make a worker aware that the trolley 100 has reached the end of the rail and can move no further in that particular longitudinal direction.

The trolley 100 also comprises one or more rollers 103A, 103B connected to the body 120. In the exemplified embodiment, there are two rollers including a first roller 103A and a second roller 103B connected to the body 120. More specifically, the first and second rollers 103A, 103B are mounted on vertically extending bolts 113A, 113B, respectively, that are secured to the body 120 of the trolley 100. The first roller 103A extends downwardly from a bottom of the first flange 125A of the primary plate 121 and the second roller 103B extends downwardly from a bottom of the second flange 125B of the primary plate 121.

In the exemplified embodiment, the first and second rollers 103A, 103B are cam rollers. It should be understood that the invention is not to be so limited in all embodiments and in certain other embodiments the first and second rollers 103A-b can take on other forms, such as including without limitation ball bearings, roller bearings, ball thrust bearings, roller thrust bearings, tapered roller bearings, plain bearings, flexure bearings, magnetic bearings or the like. In the exemplified embodiment, the first roller 103A is connected to the body 120 at a position between the first stop member 104 and the wheels 101a, 101B and the second roller 103B is connected to the body 120 at a position between the second stop member 105 and the wheels 101C, 101D. The first and second rollers 103A, 103B are connected to the body 120 adjacent to and below the rolling plane A-A. Furthermore, the first roller 103A is rotatable about an axis of rotation C-C and the second roller 103B is rotatable about an axis of rotation D-D. Each of the axes of rotation C-C, D-D are oriented substantially perpendicular to the rolling plane A-A.

As noted above, the trolley 100 also comprises the brake sub-system 150. The brake sub-system 150 both permits and prohibits longitudinal movement of the trolley 100 when the trolley is positioned within a rail or otherwise located such that vertical movement of the trolley 100 is prohibited as will be described in detail below. The brake sub-system 150 generally comprises a brake rod 151, a brake pad 152, a lanyard connector 153 and a resilient element 154. When the trolley 100 is fully assembled, the brake rod 151 is slidably coupled to the body 120 so that the brake sub-system 150 is alterable between a free state and an arrest state, which will be described in more detail below. Thus, when the trolley 100 is fully assembled, the brake rod 151 slides within the central openings 126A-128A of the collars 126-128 of the body 120.

The brake rod 151 extends along the brake axis B-B, which is oriented substantially perpendicular to the rolling plane A-A and substantially parallel to the axes of rotation C-C, D-D of the rollers 103A, 103B. In the exemplified embodiment, the brake rod 151 is generally cylindrical in shape. However, as described herein above, the invention is not to be limited by the shape of the brake rod 151 in all embodiments and the brake rod 151 can take on other shapes so long as it can be slidably received within the central openings 126A-128A of the first, second and third collars 126, 127, 128 of the body 120.

The brake rod 151 comprises a sleeve 157 on its lower portion. The sleeve 157 is essentially a larger diameter portion of the brake rod 151. The sleeve 157 comprises a threaded inner surface 158 (FIG. 21) for connecting the lanyard connector 153 to the brake rod 151 as will be described below. The brake rod 151 is coupled to a first flange 155, a second flange 156, the brake pad 152 and the lanyard connector 153. Specifically, in certain embodiments the brake rod 151 is integrally formed with the first flange 155, the second flange 156 and the brake pad 152. However, the invention is not to be so limited in all embodiments and in certain other embodiments the brake rod 151 may be separately formed from and later connected to the first flange 155, the second flange 156 and the brake pad 152 such as by welding or any other connection techniques described herein or known in the art. The first flange 155 is connected to a top end of the brake rod 151 and the lanyard connector 153 is connected to a bottom end of the brake rod 151.

The brake pad 152 generally comprises a brake plate 163 having a bottom surface 164 and a top surface 165. In the exemplified embodiment, the brake plate 163 is a flat plate and each of the bottom and top surfaces 164, 165 are flat, planar surfaces. However, the invention is not to be so limited in all embodiments and in certain other embodiments the brake plate 163 can have a contoured or other shape. Furthermore, the brake plate 163 is oriented substantially parallel to the rolling plane A-A. The brake plate 163 comprises at least one opening 166 therethrough. In the exemplified embodiment, the brake plate 163 includes four of the openings 166. Each one of the openings 166 is a threaded hole through which a set screw 167 can extend. In the exemplified embodiment, there are four set screws 167, each of which extends through one of the openings 166 in the assembled state. Of course, the invention is not to be so limited in all embodiments and in certain other embodiments more or less than four set screws 167 can be used. The set screws 167 extend through the openings 166 such that tip portions 168 of the set screws 167 form a plurality of protrusions that extend from the bottom surface 164 of the brake plate 163 of the brake pad 152. When the trolley 100 is positioned within a rail, the tip portions 168 of the set screws 167 frictionally engage upper surfaces of the rail to prevent or stop the trolley 100 from longitudinal movement when the brake sub-system 150 is in the arrest state as will be described in more detail below.

Although the exemplified embodiment illustrates the tip portions 168 of the set screws 167 forming the plurality of protrusions that extend from the bottom surface 164 of the brake plate 163, in certain other embodiments the set screws 167 may be omitted. In such embodiments, the bottom surface 164 of the brake plate 163 may engage upper surfaces of the rail when the brake sub-system 150 is in the arrest state to stop longitudinal movement of the trolley 100.

In still other embodiments, protuberances formed of rubber, metal or any other desired material may be affixed, such as by welding, adhesion or the like, to the bottom surface 164 of the brake plate 163 to form the component that frictionally engages the upper surfaces of the rail to prevent longitudinal movement of the trolley 100 when the brake sub-system 150 is in the arrest state.

The lanyard connector 153 comprises a hub portion 159, an eye 160 pivotably connected to the hub portion 159 by a pivot pin 161 and a threaded engagement portion 162. In the exemplified embodiment, the eye 160 is a U-shaped component extending downwardly from the hub portion 159. However, the invention is not to be so limited in all embodiments and in certain other embodiments the eye 160 can take on other shapes. The eye 160 is pivotable relative to the hub portion 159 about an axis of rotation F-F that is substantially parallel to the rolling plane A-A. The eye 160 is the portion of the lanyard connector 153 to which a lanyard is attached as will be described in more detail below with reference to FIG. 25. The threaded engagement portion 162 of the lanyard connector 153 operates like a threaded screw and can be connected to the sleeve 157 of the brake sub-assembly 150. More specifically, referring briefly to FIG. 21, the inner surface 158 of the sleeve 157 of the brake rod 151 is a threaded surface that engages the threaded engagement portion 162 of the lanyard connector 153 to couple the lanyard connector 153 to the brake rod 151 of the brake sub-assembly 150.

When the trolley 100 is fully assembled and the brake sub-assembly 150 is coupled to the body 120 as illustrated in FIGS. 15 and 17, the brake rod 151 extends through the first, second and third central openings 126A, 127A, 128A of the first, second and third collars 126, 127, 128 of the body 120. Furthermore, the first flange 155 of the brake sub-assembly 150 is located above the first collar 126 of the body 120 and the resilient element 154 is positioned between the first flange 155 of the brake sub-assembly 150 and the first collar 126 of the body 120. Further still, the second collar 127 of the body 120 is located below the second flange 156 of the brake sub-assembly 150 and the second flange 156 of the brake sub-assembly 150 is located below the first collar 126 of the body 120. Moreover, the third collar 128 of the body 120 is located between the first and second collars 126, 127 of the body 120 and between the first and second flanges 155, 156 of the brake sub-assembly 150. The brake pad 152 is located between the first collar 126 and the third collar 128 of the body 120. Thus, when fully assembled, the flanges 155, 156 and collars 126-128 are positioned from a top of the trolley 100 to a bottom of the trolley 100 as follows: first flange 155, first collar 126, brake pad 152, third collar 128, second flange 156, second collar 127.

The brake pad 152 is positioned within a first slot 170 in the primary plate 121 that is located between the first collar 126 and the third collar 128. The second flange 156 of the brake sub-system 150 is positioned within a second slot 171 in the primary plate 121 that is located between the second collar 127 and the third collar 128. Furthermore, the first slot 170 has a width $W_1$ that is larger than a width $W_{BP}$ of the brake pad 152 and the second slot 171 has a width $W_2$ that is larger than a width $W_F$ of the second flange 156. In certain embodiments the width $W_1$ of the first slot 170 is between ½ inch and ¾ inch, and most preferably approximately ⅝ inch. In certain embodiments the width $W_{BP}$ of the brake pad 152 is between ⅛ inch and ⅜ inch, and more preferably approximately ¼ inch. In certain embodiments the width $W_2$ of the second slot 171 is between ⅝ inch and ⅞ inch, and more preferably approximately ¾ inch. In certain embodiments the width $W_F$ of the second flange 156 is between 3/16 inch and 7/16 inch, and more preferably approximately 5/16 inch. It should be appreciated that the widths described above are not limited to the recited ranges in all embodiments and can have measurements outside of the recited ranges in certain other embodiments so long as $W_1$ is larger than $W_{BP}$ and $W_2$ is larger than $W_F$.

As a result of the relative widths described above, when the brake sub-assembly 150 is slidably received by the body 120, there is ample space within the first slot 170 for upward and downward movement of the brake pad 152 therein and ample space within the second slot 171 for upward and downward movement of the second flange 156 therein. As will be described in more detail below with reference to FIGS. 21-24, the brake pad 152 moves axially (along the brake axis B-B) within the first slot 170 and the second flange 156 moves axially (along the brake axis B-B) within the second slot 171 when the brake sub-system transitions between the free state and the arrest state.

In the exemplified embodiment, the resilient element 154 comprises a plurality of spring discs 169. It should be appreciated that the invention is not to be limited to the use of spring discs 169 as the resilient element 154 in all embodiments and other components can be used as the resilient element 154 in other embodiments such as, for example without limitation, compression springs, torsion springs, extension springs, barrel springs, spring pins, cantilever springs, leaf springs, die springs, rubber springs, wave springs, washer springs and the like. In the exemplified embodiment, the resilient element 154 comprises four spring discs 169. Of course, more or less than four spring discs 169 can be used to create a greater or lesser spring force.

In the fully assembled state described above, the spring discs 169 of the resilient element 154 exert an upward force on the first flange 155 of the brake sub-system 150 to bias or urge the brake sub-system 150 into the free state, whereby the brake pad 152, and more specifically the tip portions 168 of the set screws 167, are spaced a distance $D_1$ above the rolling plane A-A. Thus, in the free state, the resilient element 154 urges the second flange 156 axially upward within the second slot 171 and urges the brake pad 152 axially upward within the first slot 170. In certain embodiments, $D_1$ results in a clearance in a range of 1/16 inch to 3/16 inch, and more specifically approximately ⅛ inch between the brake pad 152 and the rolling plane A-A. The distance $D_1$ is measured between the tip portions 168 of the set screws 167 and the rolling plane A-A (in embodiments that use the set screws 167) when the brake sub-system 150 is in the free state. It should be appreciated that the distance $D_1$ is not limited to the above recited range in all embodiments and can be a distance outside of the recited range in certain other embodiments. Specifically, the distance $D_1$ is adjustable by screwing the set screws 167 further into or further out of the brake pad 152.

The spring discs 169 collectively exert a spring force K that is a sufficient amount of force to maintain the distance $D_1$ between the tip portions 168 of the set screws 167 and the rolling plane A-A when the brake sub-system 150 is in the free state. In certain embodiments, the spring force K is between 40 lbs. and 60 lbs., more preferably between 45 lbs. and 55 lbs., and more preferably between 46 lbs. and 50 lbs. It should be appreciated that the spring force K is not limited to being within the recited ranges in all embodiments, and the spring force K can take on other numerical values by adding more of the spring discs 169, reducing the number of spring discs 169 or changing the tension of the spring discs 169. As noted above and as will be described in more detail below with reference to FIG. 25, a lanyard may be connected to the lanyard connector 153. Thus, the spring force K is greater than the weight of the lanyard that is to be attached to the lanyard connector 153, and more preferably at least two to three times the weight of the lanyard attached to the lanyard connector 153, to avoid any accidental locking or arresting of the trolley 100. Thus, the spring force K of the spring discs 169 of the resilient element 154 is sufficient to maintain a distance, such as the distance $D_1$, between the brake pad 152 and the rolling plane A-A taking into account any components, such as a lanyard, that are normally connected to the trolley 100.

Regardless of the specific numerical value of the spring force K of the spring discs 169 of the resilient element 154, the fully assembled trolley 100 will remain fully assembled during use of the trolley 100. Specifically, the spring discs 169 will urge the brake sub-system 150 upwardly relative to the body 120 of the trolley 100. However, the brake sub-system 150 is prevented from excessive upward movement because at a certain point the top surface 165 of the brake pad 152 will contact an upper shoulder 172 of the first slot 170 of the body 120 and the second flange 156 of the brake sub-system 150 will contact the third collar 128 of the body 120. Thus, the brake pad 152 can only move between the upper shoulder 172 and a lower shoulder 173 of the first slot 170 and the second flange 156 can only move between the second collar 127 and the third collar 128. Thus, all of the components of the trolley 100 maintain their general relative positioning when the brake sub-system 150 is slidably coupled to the body 120.

As noted above, the brake sub-system 150 is alterable between a free state and an arrest state. In the free state, the brake pad 152 is spaced the distance $D_1$ above the rolling plane A-A. In the arrest state, at least a portion of the brake pad 152 is located within the rolling plane A-A. In certain embodiments, the portion of the brake pad 152 that is located within the rolling plane A-A in the arrest state is the tip portions 168 of the set screws 167. The brake sub-system 150 is biased in the free state by the resilient element 154 urging the first flange 155 upwardly and is altered from the free state to the arrest state upon a downward vertical force $F_1$ being applied to the lanyard connector 153 while vertical movement of the trolley 100 is prohibited. Of course, it should be appreciated that the downward vertical force $F_1$ required to transition the brake sub-system 150 from the free state to the arrest state is greater than any force exerted on the brake sub-system 150 by a lanyard attached to the lanyard connector 153. Transitioning of the brake sub-system 150 from the free state to the arrest state will be discussed in more detail below with particular reference to FIGS. 21-25.

Referring to FIGS. 18-25, a fall arrest system 500 that comprises the anchor trolley 100 will be described. The fall arrest system 500 comprises the trolley 100 described above and a rail 200. Common components of the trolley 100 that have been described above with reference to FIGS. 15-17 are provided with the same reference numerals in FIGS. 18-25 to indicate relative positioning of the components, but are not described in detail with particular reference to FIGS. 18-25 to avoid redundancy in the description. It should be understood that the description of construction, arrangement and operation of the components of the trolley 100 from FIGS. 15-17 is equally applicable to FIGS. 18-25 even when such description is not repeated.

Figure 18:
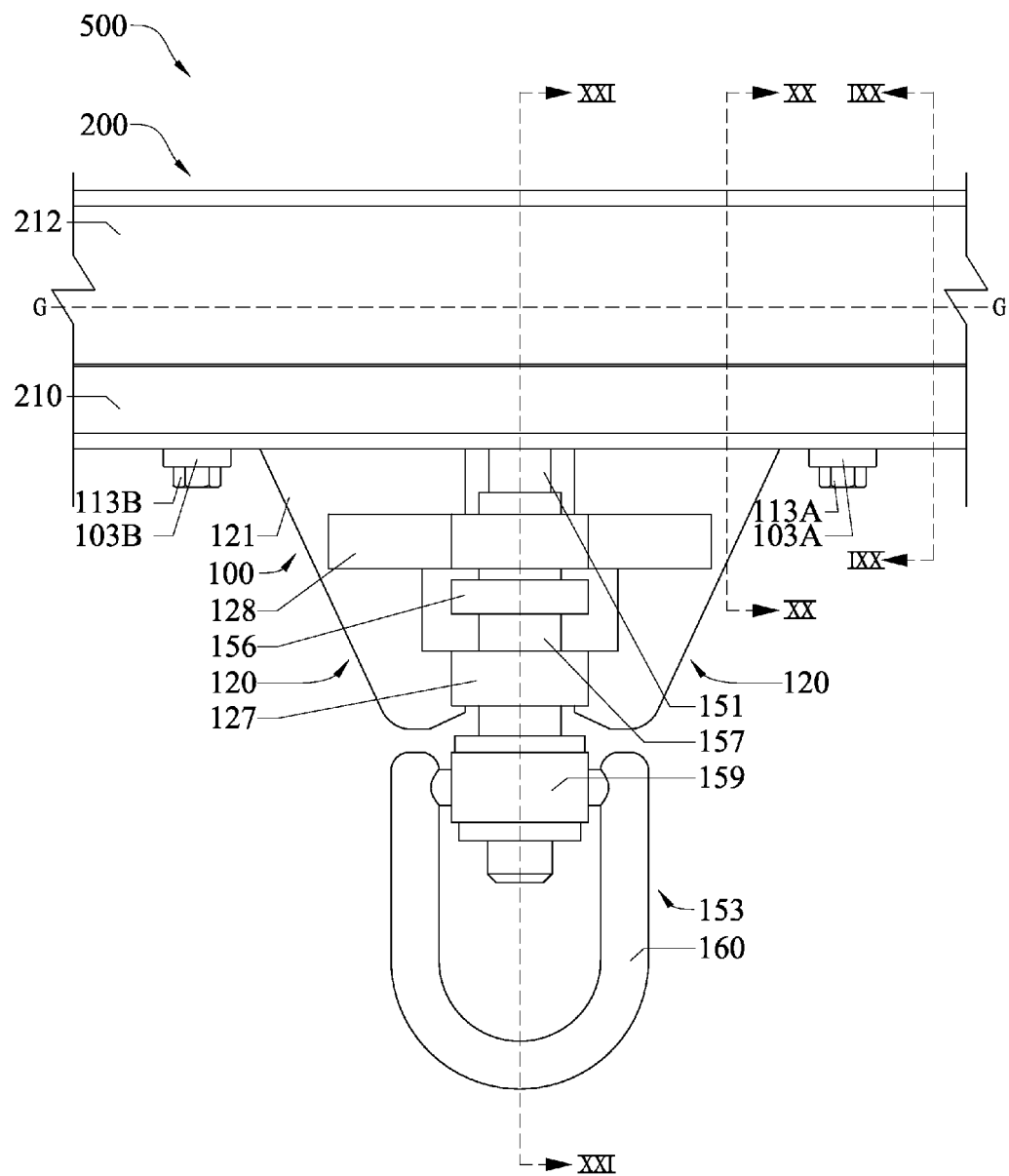
FIG. 18 is side view of the fall arrest anchor trolley of FIG. 15 disposed within a rail.
Figure 19:
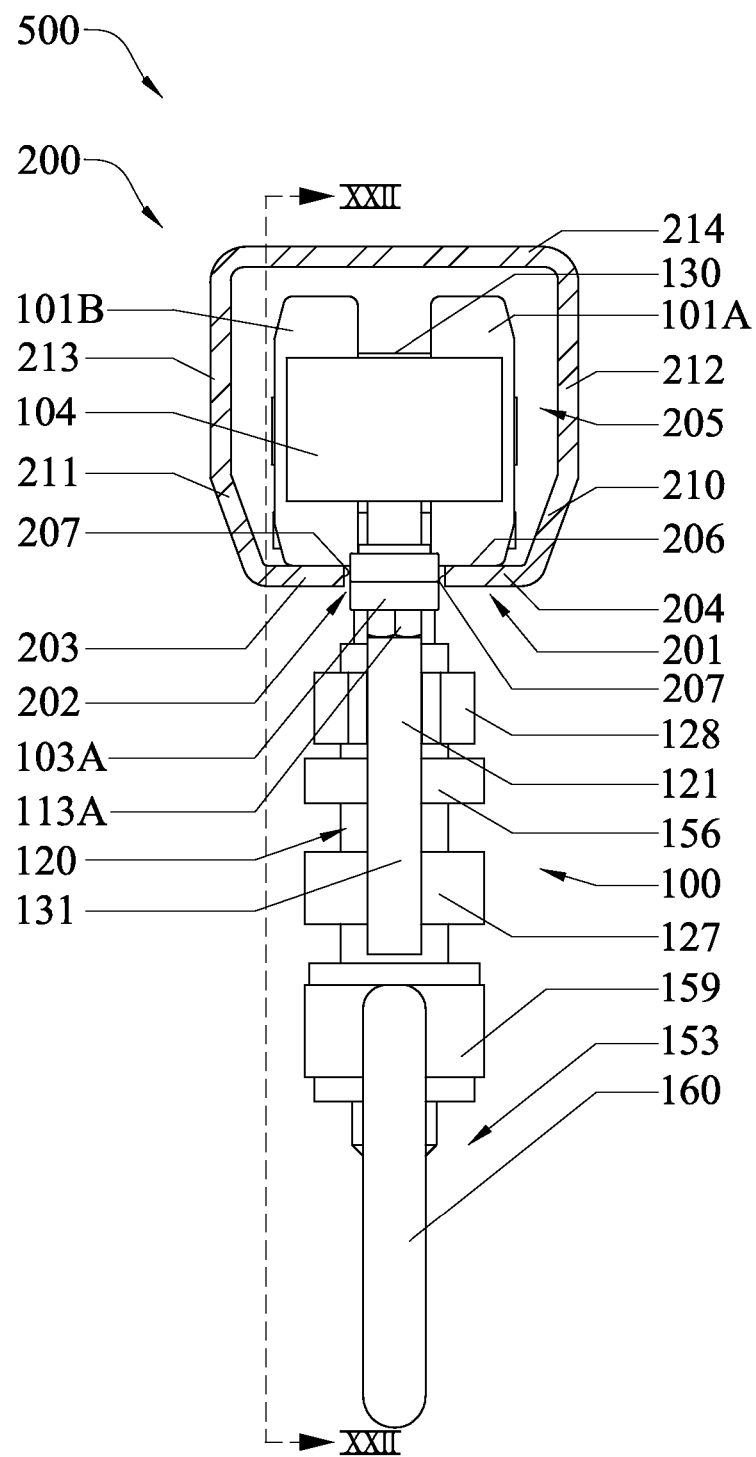
FIG. 19 is a cross-sectional view taken along line IXX-IXX of FIG. 18.
Figure 20:
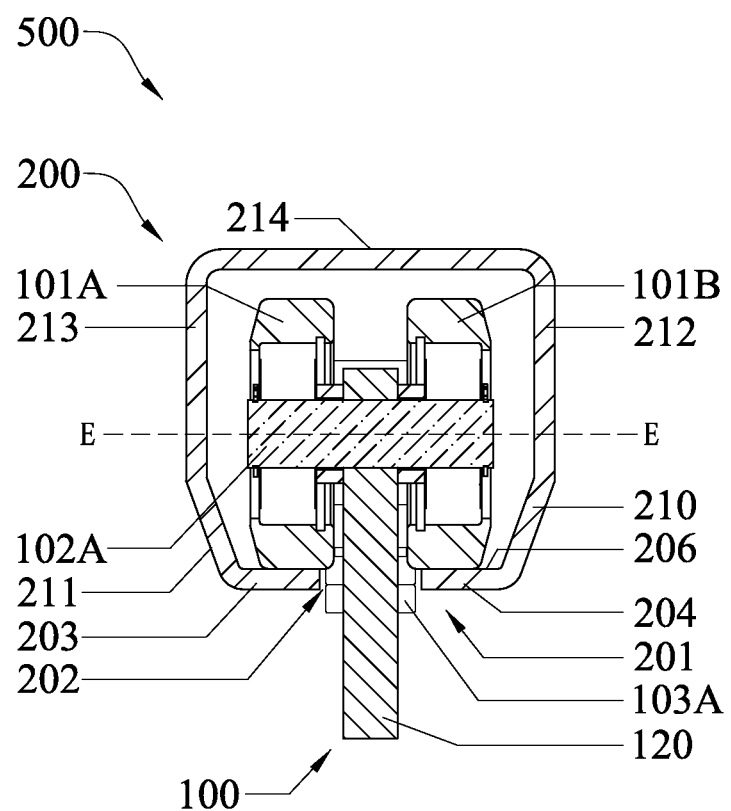
FIG. 20 is a cross-sectional view taken along line XX-XX of FIG. 18.

Referring first to FIGS. 18-20, in the exemplified embodiment the rail 200 is a rigid structure that extends along a longitudinal axis G-G. The rail 200 may be formed of any strong material, such as stainless or carbon steel or other metallic materials. The rail 200 is formed of a material with sufficient strength to support the weight of a worker. The rail 200 comprises a floor 201, a pair of angularly oriented sidewalls 210, 211 extending upwardly from the floor 201, a pair of vertical sidewalls 212, 213 extending upwardly from the pair of angularly oriented sidewalls 210, 211 and a roof 214 positioned opposite the floor 201 and extending between the pair of vertical sidewalls 212, 213.

The rail 200 further comprises a longitudinal slot 202 that separates the floor 201 into a first longitudinal section 203 and a second longitudinal section 204. The roof 214, opposing vertical and angularly oriented sidewalls 210-213 and the first and second longitudinal sections 203, 204 of the floor 201 define a cavity 205. When the trolley 100 is positioned within the rail 200, the wheels 101A-D of the trolley 100 are located within the cavity 205, and specifically in contact with the first and second longitudinal sections 203, 204 of the floor 201.

It should be understood that the rail 200 having the enclosed configuration illustrated in the exemplified embodiment is not limiting of the invention in all embodiments. Thus, in certain other embodiments the first and second longitudinal sections 203, 204 of the floor 201 can be formed by separate I-beams or L-beams that collectively define the floor 201. Thus, each of the I- or L-beams may contain one of the wheels of each pair of wheels. Moreover, in still other embodiments the rail 200 may merely omit the roof 214 or sidewalls 210-213 so that the rail 200 is not enclosed. Thus, the invention is not to be limited by the particular structural illustration of the rail provided herein in all embodiments and the rail may take on other shapes, structures or configurations in certain other embodiments.

The first and second longitudinal sections 203, 204 of the floor 201 comprise an upper surface 206 upon which the bottoms of the plurality of wheels 101A-D are in rolling contact. Thus, the upper surface 206 of the first and second longitudinal sections 203, 204 of the floor 201 of the rail 200 lies substantially along the rolling plane A-A formed by the bottoms of the wheels 101A-D. In the exemplified embodiment, the upper surface 206 of the first and second longitudinal sections 203, 204 of the floor 201 is a substantially flat surface. However, the invention is not to be so limited in all embodiments and the upper surface 206 of the first and second longitudinal sections 203, 204 of the floor 201 can be oriented at any of various angles with the wheels 101A-D similarly angled for smooth rolling contact therewith.

When the trolley 100 is positioned within the rail 200, the first portion 130 of the body 120 of the trolley 100 is positioned above the first and second longitudinal sections 203, 204 of the floor 201 and within the cavity 205 and the second portion 131 of the body 120 of the trolley 100 is located below the first and second longitudinal sections 203, 204 of the floor 201. Furthermore, the body 120 and the brake rod 151 extend through the longitudinal slot 202 in the floor 201 and the rollers 103A, 103B are located within the longitudinal slot 202. The brake pad 152 and first flange 155 of the brake sub-system 150 are positioned above the first and second longitudinal sections 203, 204 while the second flange 156 of the brake sub-system 150 and the second and third collars 127, 128 of the body 120 are positioned below the first and second longitudinal sections 203, 204. The lanyard connector 153 is connected to a bottom end of the brake rod 151 and is also positioned below the first and second longitudinal sections 203, 204.

The rollers 103A, 103B have a diameter that is slightly smaller than the width of the longitudinal slot 202 so that the rollers 103A, 103B can be centered within the longitudinal slot 202 without contacting edges 207 of the longitudinal slot 202 during normal movement of the trolley 100 along the rail 200. Thus, the rollers 103A, 103B maintain alignment of the trolley 100 on the rail 200 and roll against the edges 207 of the longitudinal slot 202 as necessary to maintain said alignment. Furthermore, the rollers 103A, 103B ensure that portions of the body 120 that extend through the longitudinal slot 202 do not engage or bind on the edges 207 of the longitudinal slot 202 when the trolley 100 moves along the rail 200.

Figure 21:
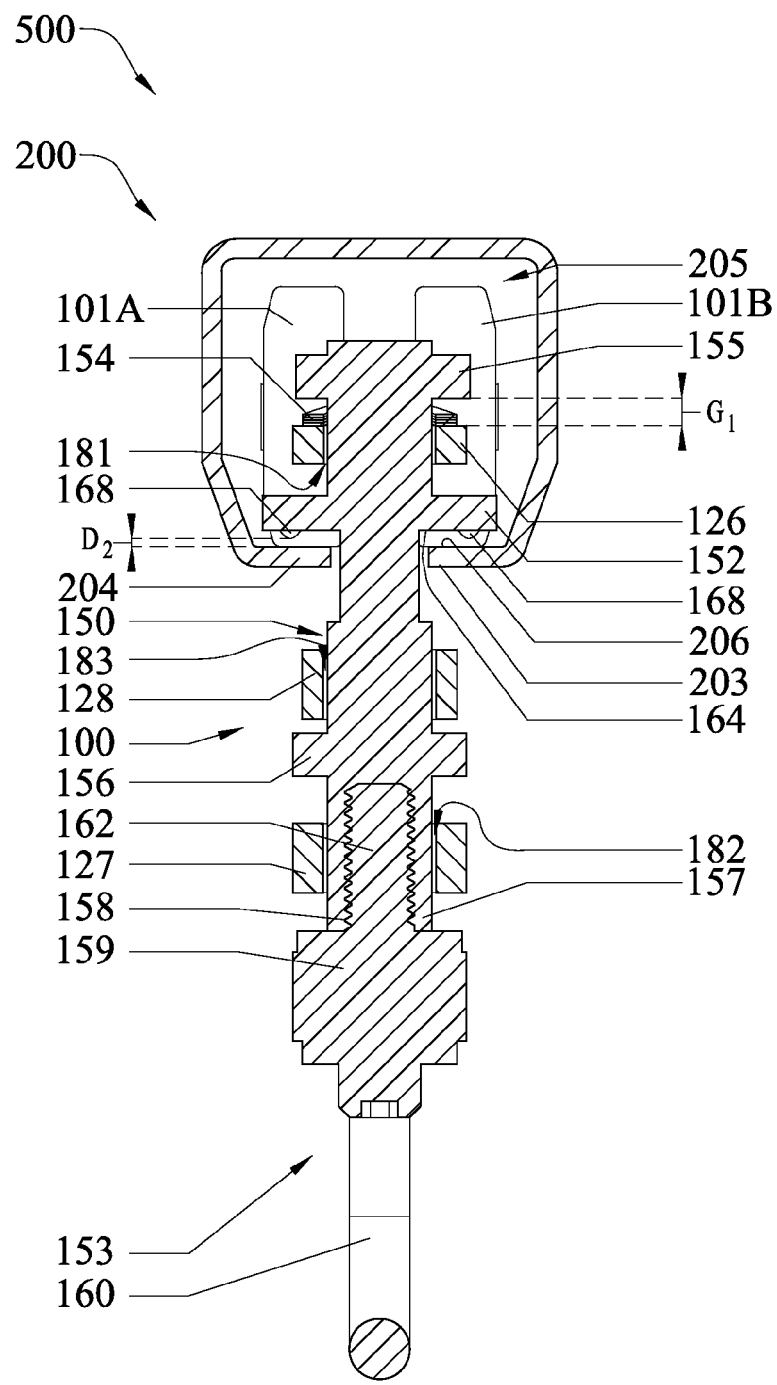
FIG. 21 is a cross-sectional view taken along line XXI-XXI of FIG. 18 with a brake sub-system in a free state.
Figure 22:
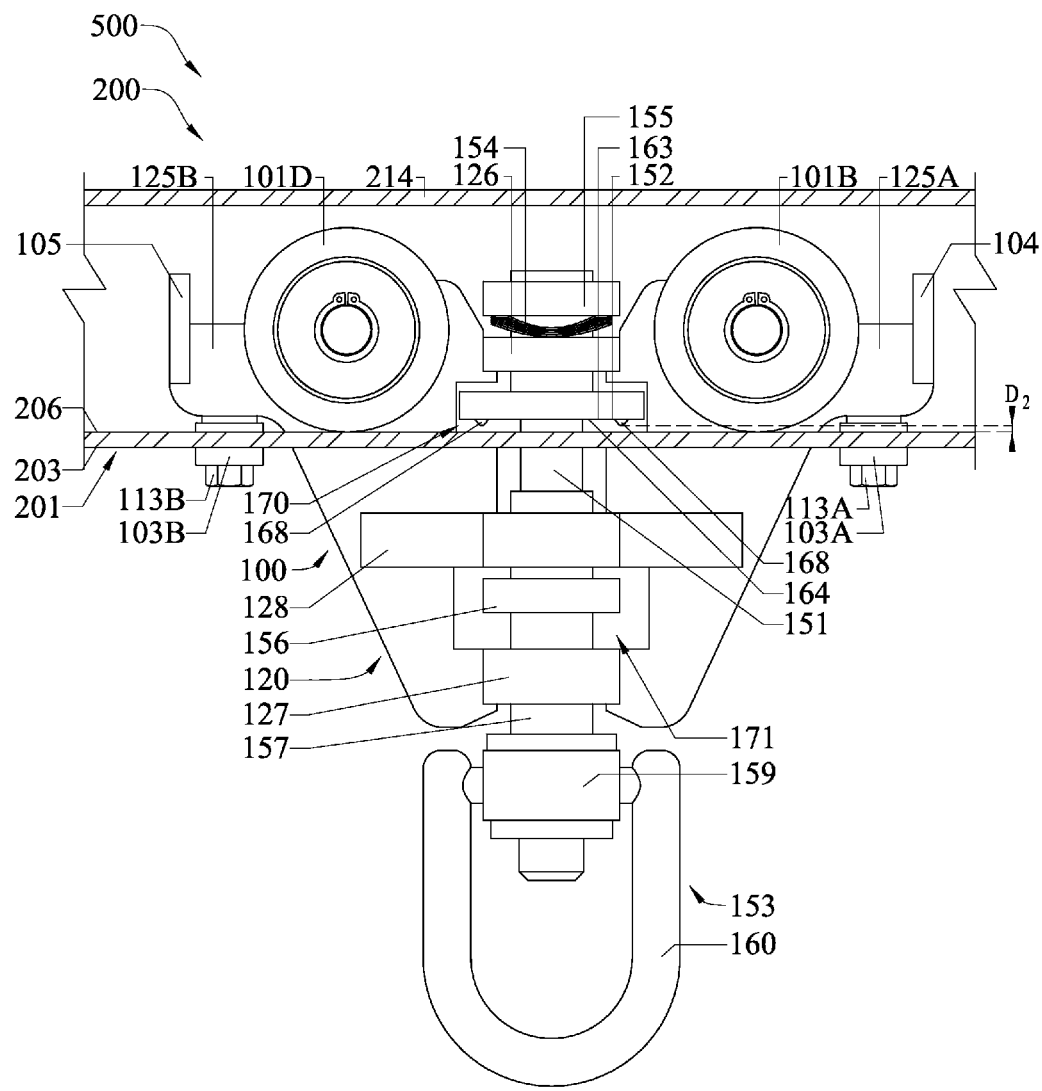
FIG. 22 is a cross-sectional view taken along line XXII-XXII of FIG. 19 with the brake sub-system in the free state.

Referring now to FIGS. 18, 21 and 22 concurrently, the fall arrest system 500 will be described with the trolley 100 positioned within the rail 200 in the free state. When the trolley 100 is positioned in the rail 200 such that the wheels 101A-D are in rolling engagement with the upper surfaces 206 of the first and second longitudinal sections 203, 204 of the floor 201 and there is no downward vertical force $F_1$ being applied to the lanyard connector 153, the resilient element 154 biases the brake sub-system 150 into the free state such that the brake pad 152 is spaced above the upper surfaces 206 of the first and second longitudinal sections 203, 204 of the rail 200. More specifically, in the free state the tip portions 168 of the set screws 167 that protrude from the bottom surface 164 of the brake pad 152 are spaced a distance $D_2$ from the upper surface 206 of the first and second longitudinal sections 203, 204 of the floor 201. This relative positioning of the components of the brake sub-system 150 relative to the rail 200 enables rolling movement of the trolley 100 along the rail 200. Because the upper surface 206 of the first and second longitudinal sections 203, 204 of the floor 201 is positioned along the same plane as the rolling plane A-A described herein above, the distance $D_2$ is substantially similar to the distance $D_1$.

When the trolley 100 is positioned within the rail 200 such that the brake sub-system 150 is in the free state, the resilient element 154 is biased so that a gap $G_1$ exists between the first flange 155 of the brake sub-system 150 and the first collar 126 of the body 120 of the trolley 100. As will be discussed below, the size of the gap between the first flange 155 of the brake sub-system 150 and the first collar 126 of the body 120 of the trolley 100 is greater when the brake sub-system 150 is in the free state than when the brake sub-system 150 is in the arrest state.

As described above, the brake sub-system 150 is received within the body 120 of the trolley 100 such that the brake sub-system 150 is able to slide upwardly and downwardly along the direction of the brake axis B-B. In order to facilitate such sliding movement, a first annular gap 181 exists between the brake sub-system 150 and the first collar 126, a second annular gap 182 exists between the brake sub-system 150 and the second collar 127, and a third annular gap 183 exists between the brake sub-system 150 and the third collar 128. The first, second and third annular gaps 181-183 create an annular space between the brake sub-system 150 and the components that are integrally formed with or welded to the body 120 of the trolley 100 to facilitate the transition of the brake sub-system 150 from the free state to the arrest state.

Figure 23:
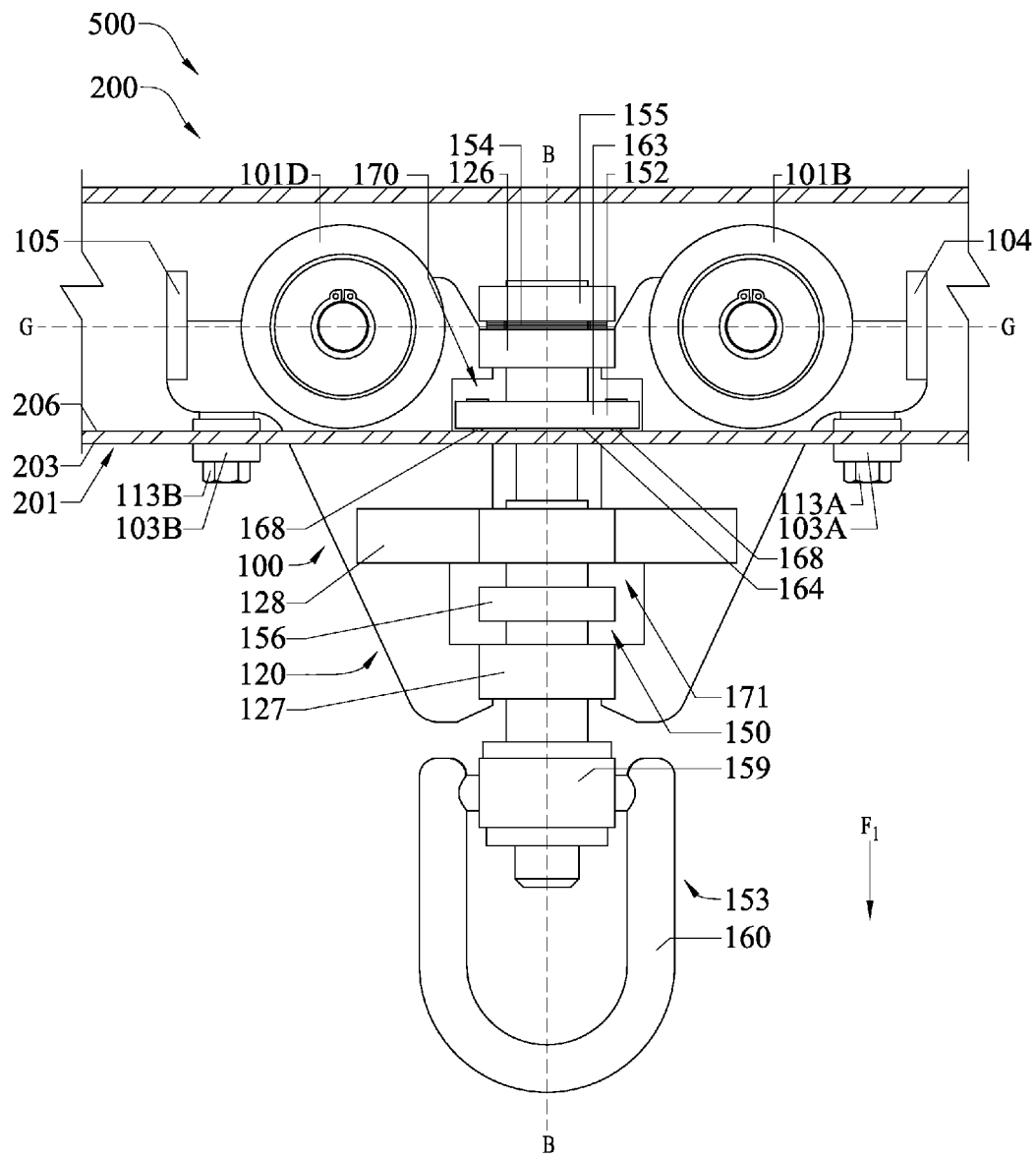
FIG. 23 is the cross-sectional view of FIG. 19 with the brake sub-system in an arrest state.
Figure 24:
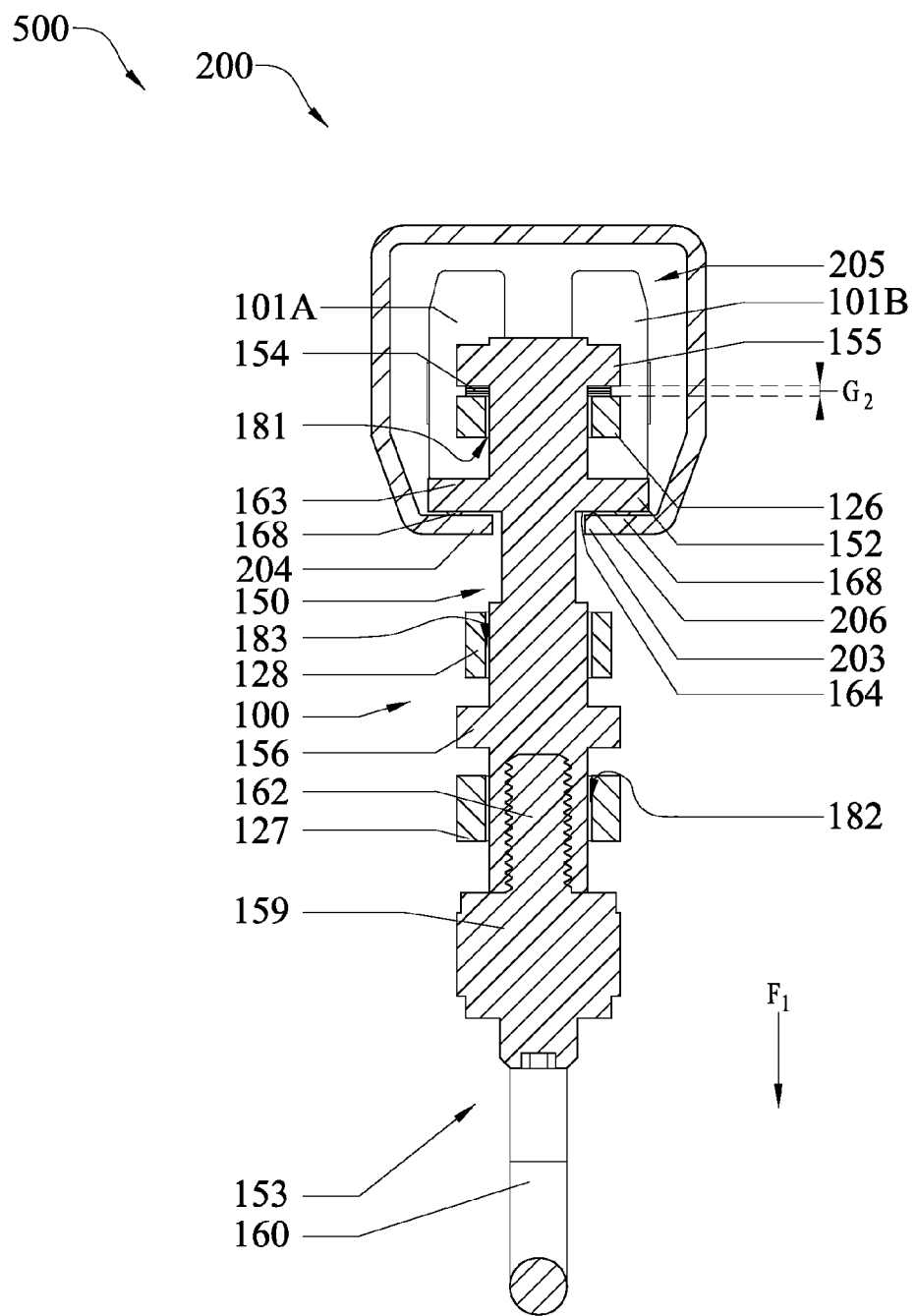
FIG. 24 is the cross-sectional view of FIG. 18 with the brake sub-system in the arrest state.

Referring now to FIGS. 23 and 24 concurrently, the fall arrest system 500 will be described with the trolley 100 positioned within the rail 200 in the arrest state. FIGS. 23 and 24 illustrate the trolley 100, and more particularly the brake sub-system 150 of the trolley 100, when a downward vertical force $F_1$ is being applied to the lanyard connector 153. As described above, the downward vertical force $F_1$ is a force that has sufficient strength to overcome the bias of the resilient element 154. In certain embodiments, the downward vertical force $F_1$ is achieved when the trolley 100, and more specifically the brake sub-system 150 of the trolley 100, supports the weight of a worker who has fallen from a work surface.

When the downward vertical force $F_1$ is applied to the brake sub-system 150 indirectly via the lanyard connector 153, a gap $G_2$ exists between the first flange 155 of the brake sub-system 150 and the first collar 126 of the body 120 of the trolley. The gap $G_2$ is substantially equal to the width of the resilient element 154 (i.e., the combined width of the spring discs 169 in embodiments that use the plurality of spring discs 169 as the resilient element 154). The gap $G_2$ is smaller than the gap $G_1$ because when a downward vertical force $F_1$ is applied to the lanyard connector 153, the entire brake sub-system 150, including the brake rod 151, the brake pad 152, the first flange 155 and the second flange 156, shift downwardly relative to the body 120 of the trolley 100 in the axial direction of the brake axis B-B.

When the brake pad 152 shifts downwardly, the tip portions 168 of the set screws 167 that protrude downwardly from the bottom surface 164 of the brake plate 163 frictionally engage the upper surfaces 206 of the first and second longitudinal sections 203, 204 of the rail 200 to prohibit rolling movement of the trolley 100 along the direction of the longitudinal axis G-G of the rail 200. It should be understood that in certain embodiments the set screws 167 form a part of the brake pad 152 such that it is the brake pad 152 that frictionally engages the upper surfaces 206 of the first and second longitudinal sections 203, 204 of the rail 200 to prohibit rolling movement of the trolley 100 along the rail 200. Furthermore, in still other embodiments the set screws 167 may be altogether omitted such that the bottom surface 164 of the brake pad 152 or some other component protruding from the bottom surface 164 of the brake pad 152 frictionally engages the upper surfaces 206 of the first and second longitudinal sections 203, 204 of the rail 200 to prohibit rolling movement of the trolley 100 along the rail 200.

Due to the relatively small nature of the distance $D_2$ between the brake pad 152 (or the tip portions 168 of the set screws 168 that protrude from the bottom surface 164 of the brake plate 163 of the brake pad 152) and the upper surfaces 206 of the first and second longitudinal sections 203, 204 of the rail 200, transitioning from the free state to the arrest state occurs essentially immediately upon the downward vertical force $F_1$ acting on the lanyard connector 153. Thus, in use, when a worker falls from a work surface, the brake sub-system 150 essentially immediately transitions from the free state to the arrest state to prohibit rolling longitudinal movement (along the longitudinal axis G-G of the rail 200) of the trolley 100. As a result, a worker who falls from a work surface will remain in near enough proximity to the work surface to be able to pull him or herself back onto the work surface after a fall. This quick arrest action of the brake sub-assembly 150 negates the need for a third party to rescue a fallen worker and removes any likelihood that the worker will suffer orthostatic intolerance due to hanging from the rail 200 and trolley 100 for an extended period of time.

Figure 25:
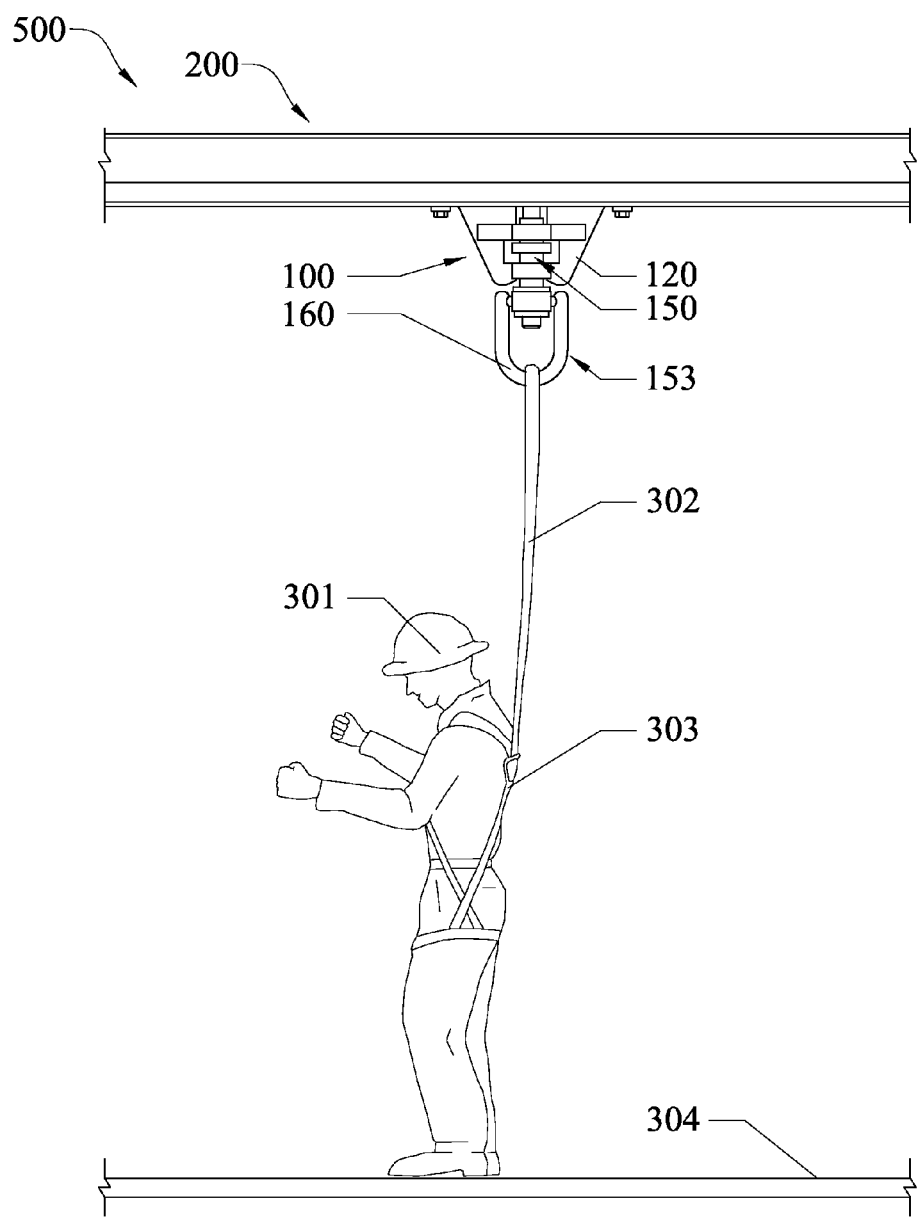
FIG. 25 is the fall arrest anchor trolley disposed within the rail of FIG. 18 with a user standing on a work surface and attached to the fall arrest anchor trolley by a lanyard.
Figure 26:
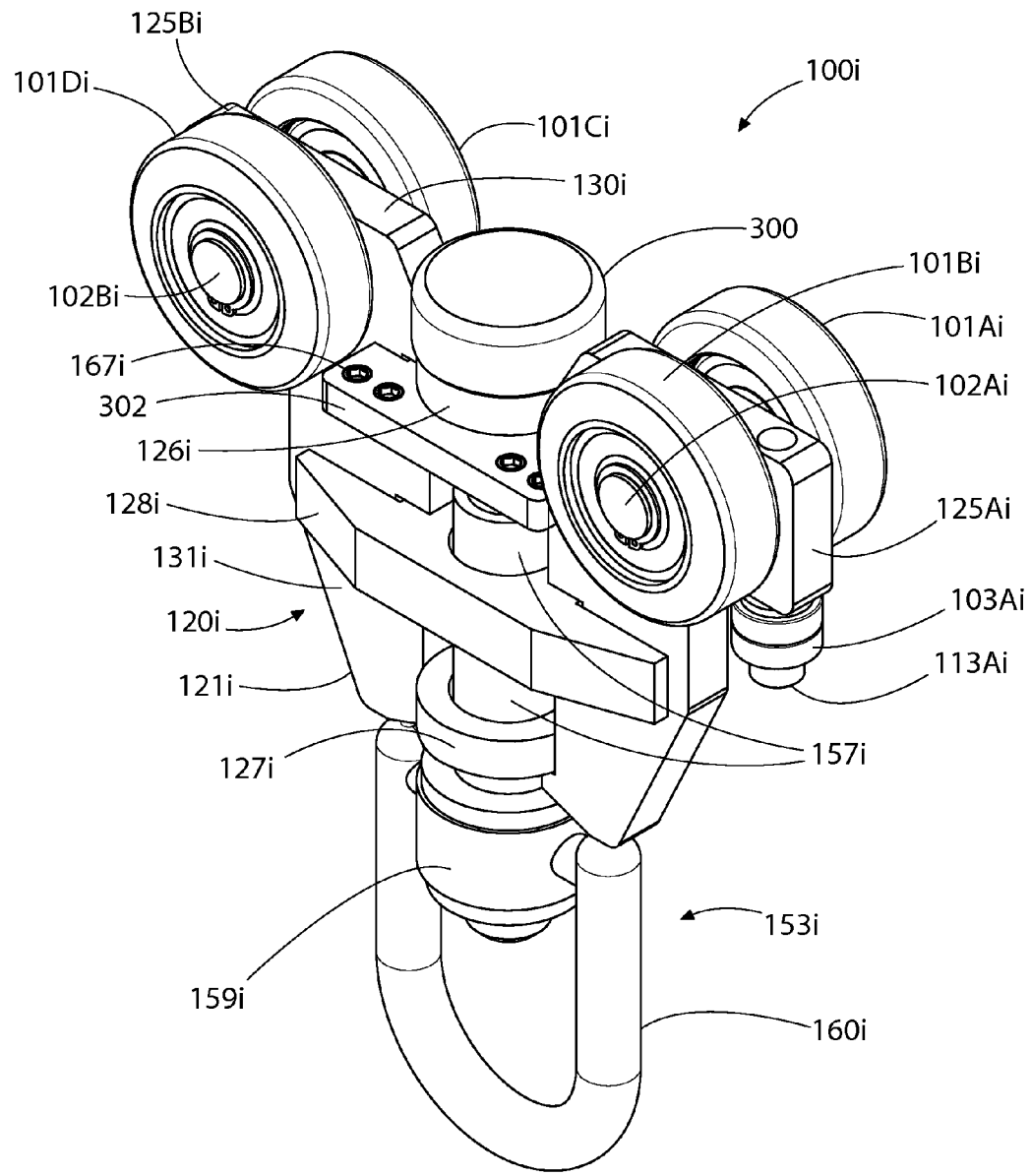
FIG. 26 is a perspective view of a fall arrest anchor trolley in accordance with yet another embodiment of the present invention.

Turning now to FIG. 25, the fall arrest system 500 is illustrated with a worker 301 standing on a work surface 304 and connected to the lanyard connector 153 of the trolley 100 by a lanyard 302. The worker 301 has a harness 303 secured onto his body to support his body should he fall from the work surface 304. The lanyard 302 is connected to (or integrally formed with) and extends from the harness 303 to its connection point with the lanyard connector 153.

The lanyard 303 can be coupled to the lanyard connector 153 by any desired method, such as by tying the lanyard 303 directly to the eye 160 of the lanyard connector 153 or attaching the lanyard 303 to the lanyard connector 153 indirectly via another component. In the exemplified embodiment, the lanyard 303 is connected directly to the lanyard connector 153 and the lanyard 303 can not be extended in length, but rather remains taut, or nearly taut with a small amount of slack, while the worker 301 is positioned on the work surface 304. Maintaining the lanyard 303 in this manner ensures that upon a fall, the brake sub-system 150 will expeditiously transition from the free state into the arrest state so that momentum will not carry the worker 301 a distance from the work surface 304. Rather, the fast action of the brake sub-system 150 will lock the trolley 100 in place on the rail 200 while the worker 301 is close enough to the work surface 304 to pull himself back onto the work surface 304 after a fall. Of course, the invention is not limited to the lanyard 303 being taut and non-extendable in all embodiments and in certain embodiments, the lanyard 303 is connected to the lanyard connector 153 by a retractor such that the lanyard 303 can be extended or shortened as needed. The retractor may be self-retracting or otherwise.

As was described above, the spring force K of the resilient element 154 (not illustrated in FIG. 25) is sufficiently strong to maintain the brake sub-system 150 of the trolley 100 in the free state even when the lanyard 302 is connected to the lanyard connector 153. Thus, the spring force K of the resilient element 154 is greater than the weight of the lanyard 302 (and the small amount of weight exerted by the brake system). As a result, while the worker 301 is positioned on the work surface 304 and connected to the fall arrest trolley 100 of the fall arrest system 500 by the lanyard 302, the trolley 100 will move longitudinally along the rail 200 in a corresponding manner with the movement of the worker 301 along the work surface 304. However, immediately upon the worker 301 falling from the work surface 304 or otherwise initiating a downward vertical force on the lanyard connector 153, the brake sub-system 150 of the trolley 100 will transition from the free state to the arrest state as has been described in detail herein. Specifically, upon the worker 301 falling from an edge of the work surface 304, the worker's weight exerts a downward vertical force $F_1$ on the lanyard connector 153. The downward vertical force $F_1$ overcomes the spring force K of the resilient member and alters the brake sub-system 150 into the arrest state in which the brake pad 154 frictionally engages the upper surface 206 of the first and second longitudinal sections 203, 204 of the rail 200 to prohibit further rolling of the trolley 100 along the rail 200 as has been described in detail herein above.

In certain embodiments, the worker 301 need not even pull himself back onto the work surface 304 after a fall therefrom. Rather, in certain embodiments, upon the worker 301 falling from an edge of the work surface 304, the fall arrest trolley 100 acts as an anchor point that returns the user back to the work surface 304 via a pendulum motion of the lanyard 302. Thus, the worker 301 may fall from the work surface 304, and the trolley 100 immediately locks into the arrest state against the rail 200. As the trolley 100 locks into the arrest state, the momentum of the worker 301 will create a pendulum motion on the lanyard 302, which will swing away from and then back towards the work surface 304, thereby returning the worker 301 to the work surface 304.

FIGS. 26-31 illustrate alternative embodiment of a fall arrest anchor trolley 100i. The anchor trolley 100i is similar to anchor trolley 100 described above and depicted in FIGS. 15-25 having substantially many of the same components. Thus, for brevity, only the structural or other components of anchor trolley 100i that are different than the anchor trolley 100 will be discussed herein below with the understanding that the description above with regard to FIGS. 15-25 applies to all other structural components identified in FIGS. 26-31. Furthermore, the components of the anchor trolley 100i have been assigned the same reference numerals as similar components from anchor trolley 100 except that the suffix "i" will be added to connote that the components are part of anchor trolley 100i shown in FIGS. 26-31. It will be understood that features that are not described below are the same as its similarly numbered feature described above.

Figure 27:
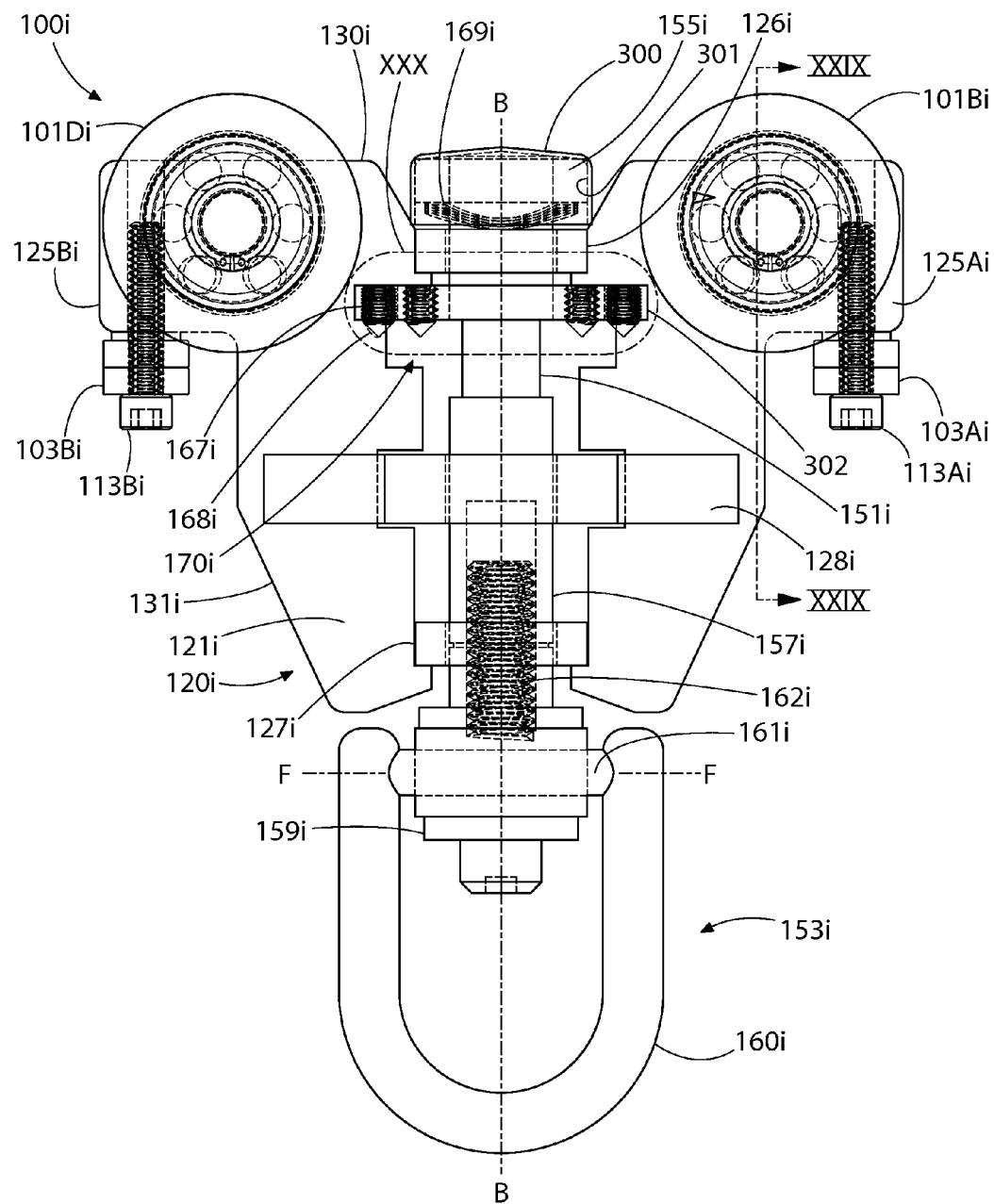
FIG. 27 is a side view of the fall arrest anchor trolley of FIG. 26.
Figure 28:
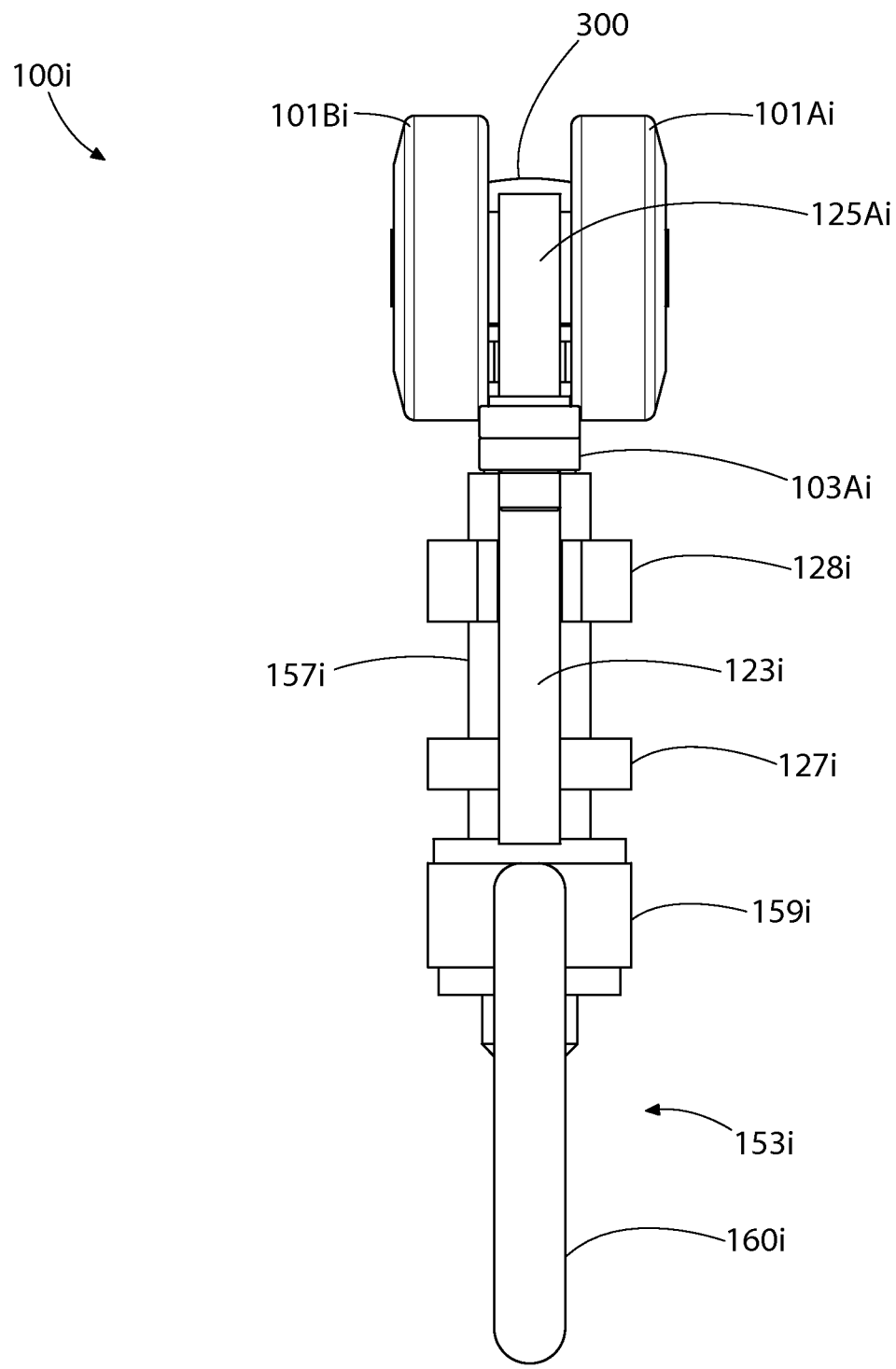
FIG. 28 is a front view of the fall arrest anchor trolley of FIG. 26.
Figure 29:
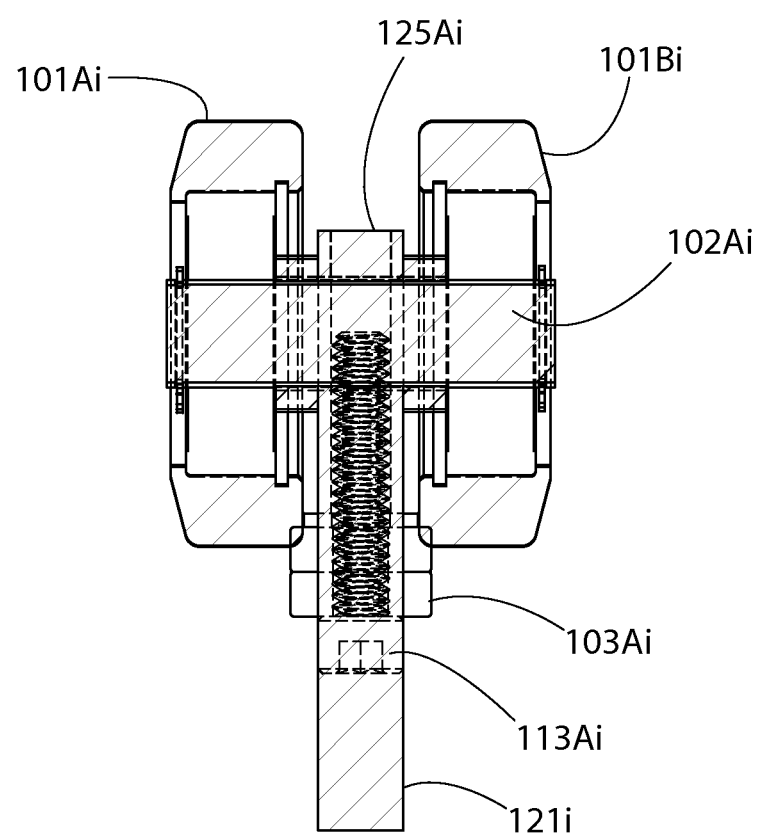
FIG. 29 is a cross-sectional view taken along line XXIX-XXIX of FIG. 27.

Referring to FIGS. 26-29, anchor trolley 100i includes a cap 300 which is added to protect the first flange 155i and particularly resilient spring discs 169i from the ingress of elements, dirt, and debris that might adversely effect full deformation of the spring discs and proper operation of the brake system. Cap 300 defines a socket 301 configured for receiving first flange 155i and spring discs 169i therein as best shown in FIG. 27. Cap 300 may be made of any suitable metallic or non-metallic material.

Anchor trolley 100i is configured to provide a more compact design which facilitates use in situations where available physical space may be more restricted. First and second stop members 104, 105 are eliminated from first and second flanges 125Ai and 125Bi, respectively, as shown. In addition, the body 120i including primary plate 121i is generally more compact in design and shortened longitudinally between first and second flanges 125Ai and 125Bi. To help facilitate this, rollers 103Ai and 103Bi are moved at least partially inboard of the wheels 101Ai-Di, as best shown in FIG. 27. In one embodiment, the outermost extremities of rollers 103Ai and 103Bi fall on approximately the same vertical plane defined parallel to brake axis B-B as the outermost extremities of wheels 101Ai-Di. Anchor trolley 100i further eliminates second flange 156 from sleeve 157 shown in FIG. 16 of the previous embodiment such that new sleeve 157i no longer includes a second flange. This further contributes to the compact design of anchor trolley 100i and reduces weight and component costs.

Figure 30:
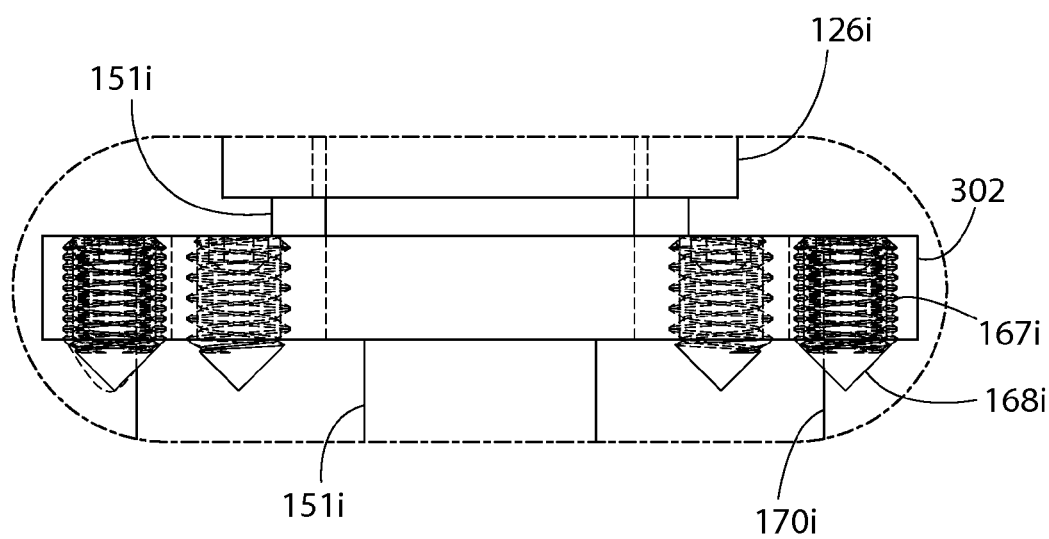
FIG. 30 is a close-up view of area XXX of FIG. 27.
Figure 31:
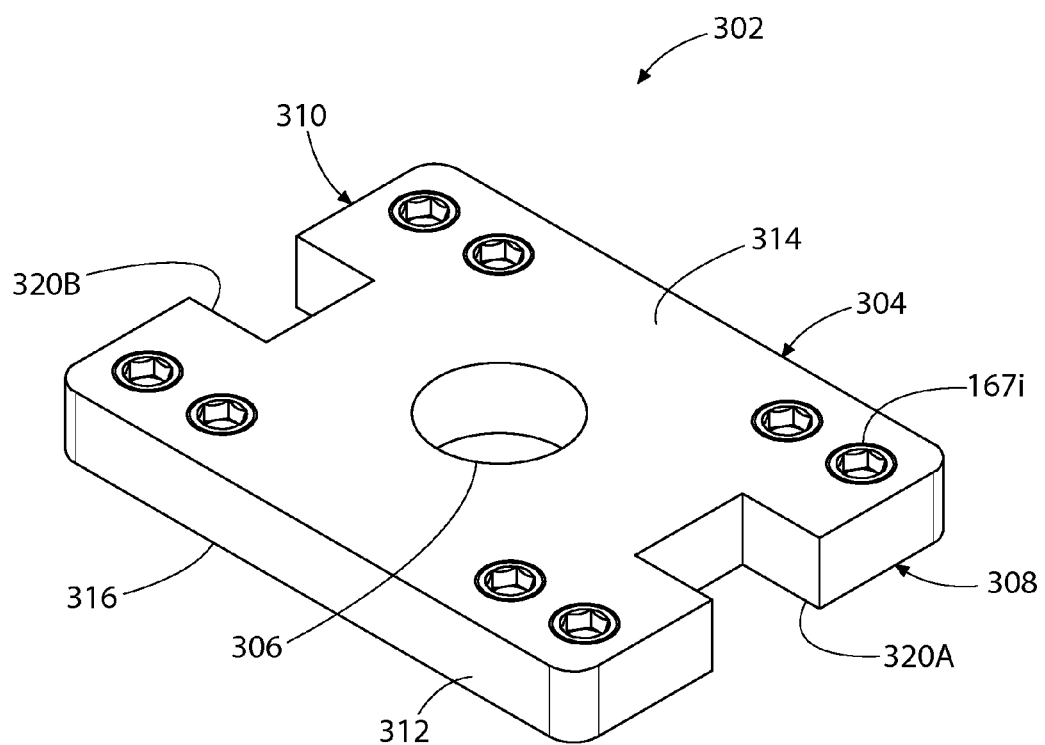
FIG. 31 is a perspective view of the brake pad of the fall arrest anchor trolley of FIG. 26 removed therefrom.

Referring to FIGS. 26-27 and 30-31, a new brake plate 302 is provided in anchor trolley 100i which advantageously increases the applied braking force when the brake sub-system 150 is activated to the arrest state as previously described herein. In one preferred embodiment, brake plate 302 includes eight (8) set screws 167i to double the braking force in contrast to the embodiment shown in FIGS. 15 and 16. To produce this benefit, brake plate 302 has a generally H-shaped body 304 as best shown in FIG. 31. Brake plate 302 includes a top surface 314, bottom surface 316, first end 308, opposing end 310, and opposing lateral sides 312 extending longitudinally between the ends. In one embodiment, lateral sides 312 may be arranged in substantially parallel relationship. A central aperture 306 is provided which slidably receives brake rod 151i through the aperture as shown in FIG. 27.

With continuing reference to FIGS. 26-27 and 30-31, brake plate 302 includes a plurality of set screws 167i which are threadly engaged through mating threaded holes in the brake plate. In one preferred embodiment, eight set screws 167i are provided which are comprised of four pairs of screws disposed near each corner of the brake plate 302. It will be appreciated that any suitable arrangement or number of set screws 167i may be used. As shown in the figures, the tip portions 168i extend below brake plate 302 as best shown in FIG. 30 to frictionally engage upper surfaces of the rail to prevent or stop the trolley 100i from longitudinal movement when the brake sub-system 150 is in the arrest state similar to the arrangement of set screws 167 shown in FIGS. 15-25.

In order to provide an H-shaped body 304, a cutout 320A, 320B is provided at each end 308 and 310 respectively. The cutouts 320A, 320B slidably receive a portion of first and second flanges 125Ai, 125Bi adjacent each lateral side of first slot 170i (see, e.g. FIGS. 26-27), thereby allowing the brake plate 302 to have a longer longitudinal length for adding extra set screws 167i without sacrificing structural strength for withstanding braking forces. When the brake sub-system 150 transitions from the free state to the arrest state as described herein, the lateral portions of first and second flanges 125Ai, 125Bi adjacent each lateral side of first slot 170i will move vertically up/down within each cutouts 320A, 320B.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A fall arrest system comprising:
a rail extending along a longitudinal axis, the rail comprising a floor and a longitudinal slot separating the floor into a first longitudinal section and a second longitudinal section;
a trolley positioned on the rail, the trolley comprising:
a body;
a plurality of wheels in rollable contact with upper surfaces of the first and second longitudinal sections, bottoms of the plurality of wheels collectively defining a rolling plane;
a brake sub-system comprising:
a brake pad positioned above the first and second longitudinal sections of the rail; and
a resilient element positioned above the first and second longitudinal sections of the rail and located above the rolling plane;
a pair of rollers located within the longitudinal slot for maintaining alignment of the trolley on the rail, each of the pair of rollers rotatable about an axis of rotation that is oriented substantially perpendicular to the rolling plane;
a lanyard connector positioned below the first and second longitudinal sections of the rail, the lanyard connector comprising a hub portion and an eye;
the brake sub-system alterable between: (1) an arrest state in which the brake pad frictionally engages the upper surfaces of the first and second longitudinal sections of the rail to prohibit rolling movement of the trolley along the rail; and (2) a free state in which the brake pad is spaced a distance above the upper surfaces of the first and second longitudinal sections of the rail to allow rolling movement of the trolley along the rail; and
the resilient element biasing the brake sub-system into the free state.

2. The fall arrest system of claim 1 further comprising:
the brake pad comprising a planar bottom surface that is substantially parallel to the rolling plane; and
wherein in the arrest state, a first portion of the planar bottom surface of the brake pad frictionally engages the upper surface of the first longitudinal section of the rail and a second portion of the planar bottom surface of the brake pad frictionally engages the upper surface of the second longitudinal section of the rail.

3. The fall arrest system of claim 2 further comprising:
the first longitudinal section of the rail having a first longitudinal edge, the second longitudinal section of the rail having a second longitudinal edge, and the first and second longitudinal edges defining the longitudinal slot; and
wherein in the arrest state no portion of the brake pad contacts the first and second longitudinal edges.

4. The fall arrest system of claim 2 wherein the brake pad comprises of a brake plate oriented substantially parallel to the rolling plane.

5. The fall arrest system of claim 1 further comprising:
the plurality of wheels consisting of a first pair of wheels rotatable about a first axis and a second pair of wheels rotatable about a second axis; and
a vertical plane, defined by the lanyard connector, located between the first pair of wheels and the second pair of wheels, the lanyard connector intersected by the vertical plane that is perpendicular to the rolling plane and intersects the longitudinal slot.

6. The fall arrest system of claim 5 further comprising:
the body extending through the longitudinal slot of the rail so that a first portion of the body is positioned above the first and second longitudinal sections of the rail and a second portion of the body is located below the first and second longitudinal sections of the rail;
the second portion of the body comprising a collar having a central opening; and
a rod coupled to the lanyard connector and extending through the central opening of the collar.

7. The fall arrest system of claim 1 further comprising:
tops of the plurality of wheels collectively define an upper plane; and
the resilient element located between the rolling plane and the upper plane.

8. The fall arrest system of claim 1 further comprising:
a lanyard coupled to the lanyard connector, the lanyard having a weight; and
wherein the resilient element has a spring force that is greater than the weight of the lanyard.

9. The fall arrest system of claim 1 further comprising:
the brake pad comprising a brake plate oriented substantially parallel to the rolling plane;
the brake pad comprising a planar bottom surface that is substantially parallel to the rolling plane, wherein in the arrest state, a first portion of the planar bottom surface of the brake pad frictionally engages the upper surface of the first longitudinal section of the rail and a second portion of the planar bottom surface of the brake pad frictionally engages the upper surface of the second longitudinal section of the rail;

tops of the plurality of wheels collectively defining an upper plane, the resilient element comprising one or more spring discs located between the rolling plane and the upper plane;

the plurality of wheels consisting of a first pair of wheels rotatable about a first axis and a second pair of wheels rotatable about a second axis, a vertical plane defined by the lanyard connector is located between the first pair of wheels and the second pair of wheels, the lanyard connector intersected by the vertical plane that is perpendicular to the rolling plane and intersects the longitudinal slot; and the body extending through the longitudinal slot of the rail so that a first portion of the body is positioned above the first and second longitudinal sections of the rail and a second portion of the body is located below the first and second longitudinal sections of the rail, the second portion of the body comprising a collar having a central opening, and a rod coupled to the lanyard connector and extending through the central opening of the collar.

10. A fall arrest system comprising:
a trolley comprising:
  a body;
  a plurality of wheels having bottoms that collectively define a rolling plane;
  a brake sub-system comprising:
    a brake pad positioned above the rolling plane; and
    a resilient element positioned above the rolling plane;
  a pair of rollers extending below the rolling plane, each of the pair of rollers rotatable about an axis of rotation that is oriented substantially perpendicular to the rolling plane;
  a lanyard connector positioned below the rolling plane;
  the brake sub-system alterable between: (1) an arrest state in which a bottom surface of the brake pad is at or below the rolling plane to prohibit rolling movement of the trolley along the rolling plane; and (2) a free state in which the bottom surface of the brake pad is spaced a distance above the rolling plane to allow rolling movement of the trolley along the rolling plane; and
  the resilient element biasing the brake sub-system into the free state;
a lanyard coupled to the lanyard connector; and
a harness coupled to the lanyard.

11. The fall arrest system of claim 10 further comprising:
the bottom surface of the brake pad being a planar bottom surface that is substantially parallel to the rolling plane; and
wherein in the arrest state, a first portion of the planar bottom surface of the brake pad is at or below the rolling plane and a second portion of the planar bottom surface of the brake pad is at or below the rolling plane.

12. The fall arrest system of claim 10 further comprising:
the plurality of wheels consisting of a first pair of wheels rotatable about a first axis and a second pair of wheels rotatable about a second axis; and
a vertical plane defined by the lanyard connector is located between the first pair of wheels and the second pair of wheels, the lanyard connector intersected by the vertical plane that is perpendicular to the rolling plane.

13. The fall arrest system of claim 10 further comprising:
the brake pad comprising a brake plate oriented substantially parallel to the rolling plane;
the bottom surface of the brake pad being a planar bottom surface that is substantially parallel to the rolling plane, wherein in the arrest state a first portion of the planar bottom surface of the brake pad is at or below the rolling plane and a second portion of the planar bottom surface of the brake pad is at or below the rolling plane;

tops of the plurality of wheels collectively defining an upper plane, the resilient element comprising one or more spring discs located between the rolling plane and the upper plane;

the plurality of wheels consisting of a first pair of wheels rotatable about a first axis and a second pair of wheels rotatable about a second axis, a vertical plane defined by the lanyard connector is located between the first pair of wheels and the second pair of wheels, the lanyard connector intersected by the vertical plane that is perpendicular to the rolling plane and intersects the longitudinal slot; and the body having a first portion located above the rolling plane and a second portion of located below the rolling plane, the second portion of the body comprising a collar having a central opening, and a rod coupled to the lanyard connector and extending through the central opening of the collar.

14. A fall arrest system comprising:
a rail extending along a longitudinal axis, the rail comprising a floor and a longitudinal slot separating the floor into a first longitudinal section and a second longitudinal section;
a trolley positioned on the rail, the trolley comprising:
  a body;
  a plurality of wheels in rollable contact with upper surfaces of the first and second longitudinal sections;
  a brake sub-system comprising:
    a brake pad positioned above the first and second longitudinal sections of the rail; and
    a resilient element positioned above the first and second longitudinal sections of the rail, wherein the resilient element comprises one or more spring discs;
  the brake sub-system alterable between: (1) an arrest state in which the brake pad frictionally engages the upper surfaces of the first and second longitudinal sections of the rail to prohibit rolling movement of the trolley along the rail; and (2) a free state in which the brake pad is spaced a distance above the upper surfaces of the first and second longitudinal sections of the rail to allow rolling movement of the trolley along the rail; and
  the resilient element biasing the brake sub-system into the free state.

15. The fall arrest system of claim 14 further comprising:
bottoms of the plurality of wheels collectively define a rolling plane; and
the upper surfaces of the first and second longitudinal sections being substantially parallel to the rolling plane.

16. A fall arrest system comprising:
a rail extending along a longitudinal axis, the rail comprising a floor and a longitudinal slot separating the floor into a first longitudinal section and a second longitudinal section;
a trolley positioned on the rail, the trolley comprising:
  a body;
  a plurality of wheels in rollable contact with upper surfaces of the first and second longitudinal sections;
  a brake sub-system comprising:
    a brake pad positioned above the first and second longitudinal sections of the rail; and a resilient element positioned above the first and second longitudinal sections of the rail;
a pair of rollers located within the longitudinal slot for maintaining alignment of the trolley on the rail;
a lanyard connector positioned below the first and second longitudinal sections of the rail, the lanyard connector comprising a hub portion and an eye;
the brake sub-system alterable between: (1) an arrest state in which the brake pad frictionally engages the upper surfaces of the first and second longitudinal sections of the rail to prohibit rolling movement of the trolley along the rail; and (2) a free state in which the brake pad is spaced a distance above the upper surfaces of the first and second longitudinal sections of the rail to allow rolling movement of the trolley along the rail; and
the resilient element biasing the brake sub-system into the free state;
a lanyard coupled to the lanyard connector; and
a harness coupled to the lanyard.

17. A fall arrest system comprising:
a rail extending along a longitudinal axis, the rail comprising a floor and a longitudinal slot separating the floor into a first longitudinal section and a second longitudinal section;
a trolley positioned on the rail, the trolley comprising:
  a body;
  a plurality of wheels in rollable contact with upper surfaces of the first and second longitudinal sections;
  a brake sub-system comprising:
    a brake pad positioned above the first and second longitudinal sections of the rail; and
    a resilient element positioned above the first and second longitudinal sections of the rail, wherein the resilient element comprises one or more spring discs;
  a pair of rollers located within the longitudinal slot for maintaining alignment of the trolley on the rail;
  a lanyard connector positioned below the first and second longitudinal sections of the rail, the lanyard connector comprising a hub portion and an eye;
  the brake sub-system alterable between: (1) an arrest state in which the brake pad frictionally engages the upper surfaces of the first and second longitudinal sections of the rail to prohibit rolling movement of the trolley along the rail; and (2) a free state in which the brake pad is spaced a distance above the upper surfaces of the first and second longitudinal sections of the rail to allow rolling movement of the trolley along the rail; and
  the resilient element biasing the brake sub-system into the free state.

18. A fall arrest system comprising:
a rail extending along a longitudinal axis, the rail comprising a floor, a longitudinal slot separating the floor into a first longitudinal section and a second longitudinal section, a roof, a first angularly oriented sidewall extending upward from the first longitudinal section, a first vertically oriented sidewall extending from the first angularly oriented sidewall to the roof, a second angularly oriented sidewall extending upward from the second longitudinal section, and a second vertically oriented sidewall extending from the second angularly oriented sidewall to the roof;
a trolley positioned on the rail, the trolley comprising:
  a body;
  a plurality of wheels in rollable contact with upper surfaces of the first and second longitudinal sections;
  a brake sub-system comprising:
    a brake pad positioned above the first and second longitudinal sections of the rail; and
    a resilient element positioned above the first and second longitudinal sections of the rail;
  a pair of rollers located within the longitudinal slot for maintaining alignment of the trolley on the rail;
  a lanyard connector positioned below the first and second longitudinal sections of the rail, the lanyard connector comprising a hub portion and an eye;
  the brake sub-system alterable between: (1) an arrest state in which the brake pad frictionally engages the upper surfaces of the first and second longitudinal sections of the rail to prohibit rolling movement of the trolley along the rail; and (2) a free state in which the brake pad is spaced a distance above the upper surfaces of the first and second longitudinal sections of the rail to allow rolling movement of the trolley along the rail; and
  the resilient element biasing the brake sub-system into the free state.

19. A fall arrest system comprising:
a rail extending along a longitudinal axis, the rail comprising a floor and a longitudinal slot separating the floor into a first longitudinal section and a second longitudinal section;
a trolley positioned on the rail, the trolley comprising:
  a body;
  a plurality of wheels in rollable contact with upper surfaces of the first and second longitudinal sections;
  a lanyard connector;
  a brake sub-system comprising:
    a brake pad positioned above the first and second longitudinal sections of the rail; and
    a resilient element positioned above the first and second longitudinal sections of the rail;
  the brake sub-system alterable between: (1) an arrest state in which the brake pad frictionally engages the upper surfaces of the first and second longitudinal sections of the rail to prohibit rolling movement of the trolley along the rail; and (2) a free state in which the brake pad is spaced a distance above the upper surfaces of the first and second longitudinal sections of the rail to allow rolling movement of the trolley along the rail; and
  the resilient element biasing the brake sub-system into the free state;
a lanyard coupled to the lanyard connector; and
a harness coupled to the lanyard.

* * * * *